US009496757B2

(12) United States Patent
Mariotto

(10) Patent No.: US 9,496,757 B2
(45) Date of Patent: Nov. 15, 2016

(54) ELECTRIC MACHINE WITH INTERMEDIATE PIECES HAVING MULTIPLE AIR GAPS AND A 3D MAGNETIC FLUX

(71) Applicants: AIRBUS HELICOPTERS, Marignane (FR); MBDA FRANCE, Paris (FR); SINTERTECH, Veurey-Voroize (FR)

(72) Inventor: Damien Mariotto, Lambesc (FR)

(73) Assignees: Airbus Helicopters, Marignane (FR); Sintertech, Veurey-Voroize (FR); MBDA France, Paris (FR)

( * ) Notice: Subject to any disclaimer, the term of this patent is extended or adjusted under 35 U.S.C. 154(b) by 222 days.

(21) Appl. No.: 14/147,987

(22) Filed: Jan. 6, 2014

(65) Prior Publication Data

US 2014/0191613 A1 Jul. 10, 2014

(30) Foreign Application Priority Data

Jan. 9, 2013 (FR) ..................................... 13 00031

(51) Int. Cl.
*H02K 21/12* (2006.01)
*H02K 1/14* (2006.01)
*H02K 21/24* (2006.01)

(52) U.S. Cl.
CPC .............. *H02K 1/145* (2013.01); *H02K 21/24* (2013.01); *H02K 2201/12* (2013.01); *Y02E 10/725* (2013.01)

(58) Field of Classification Search
CPC ........... H02K 1/145; H02K 1/243; H02K 5/15
(Continued)

(56) References Cited

U.S. PATENT DOCUMENTS 6,509,666 B1 * 1/2003 Huang .................. H02K 1/145
310/254.1
7,279,820 B2 10/2007 Grundl et al.
(Continued)

FOREIGN PATENT DOCUMENTS

CN 101212150 7/2008
EP 0613229 8/1994
(Continued)

OTHER PUBLICATIONS

French Search Report for FR 1300031, Completed by the French Patent Office on Feb. 14, 2014, 8 pages.
(Continued)

*Primary Examiner* — Dang Le
*Assistant Examiner* — Leda Pham
(74) *Attorney, Agent, or Firm* — Brooks Kushman P.C.

(57) ABSTRACT

An electric machine including a stator that is provided with at least one exciter unit including a coil, at least two annular yokes and at least one row of intermediate pieces, and a rotor having a structure and at least one receiver unit including at least two series of at least two rows of magnets. Two sides of each yoke include the first teeth, fitting with the intermediate pieces on a face of the exciter unit and alternatingly forming the second north poles and the second south poles. Each series is positioned opposite one face, forming an air gap with the exciter unit, with the electric machine thus including at least two air gaps, with a flux thus circulating inside the electric machine, dividing and regrouping itself in the vicinity of the magnets and of the yokes.

20 Claims, 14 Drawing Sheets

(58) Field of Classification Search
USPC .................................................. 310/257, 263
See application file for complete search history.

(56) References Cited

U.S. PATENT DOCUMENTS

| | | |
|---|---|---|
| 2006/0244329 A1 | 11/2006 | Grundl et al. |
| 2009/0001843 A1* | 1/2009 | Enomoto ............... H02K 1/145 |
| | | 310/257 |
| 2013/0099619 A1 | 4/2013 | Bernot et al. |

FOREIGN PATENT DOCUMENTS

| | | |
|---|---|---|
| EP | 1770846 | 4/2007 |
| FR | 2828027 | 1/2003 |
| FR | 2959621 | 11/2011 |
| FR | 2961037 | 12/2011 |
| WO | 2004107541 | 12/2004 |

OTHER PUBLICATIONS

Gieras et al. Kluwer Academic Publishers 2004, 4 Pages, "Axial Flux Permanent Magnet Brushless Machines."

* cited by examiner

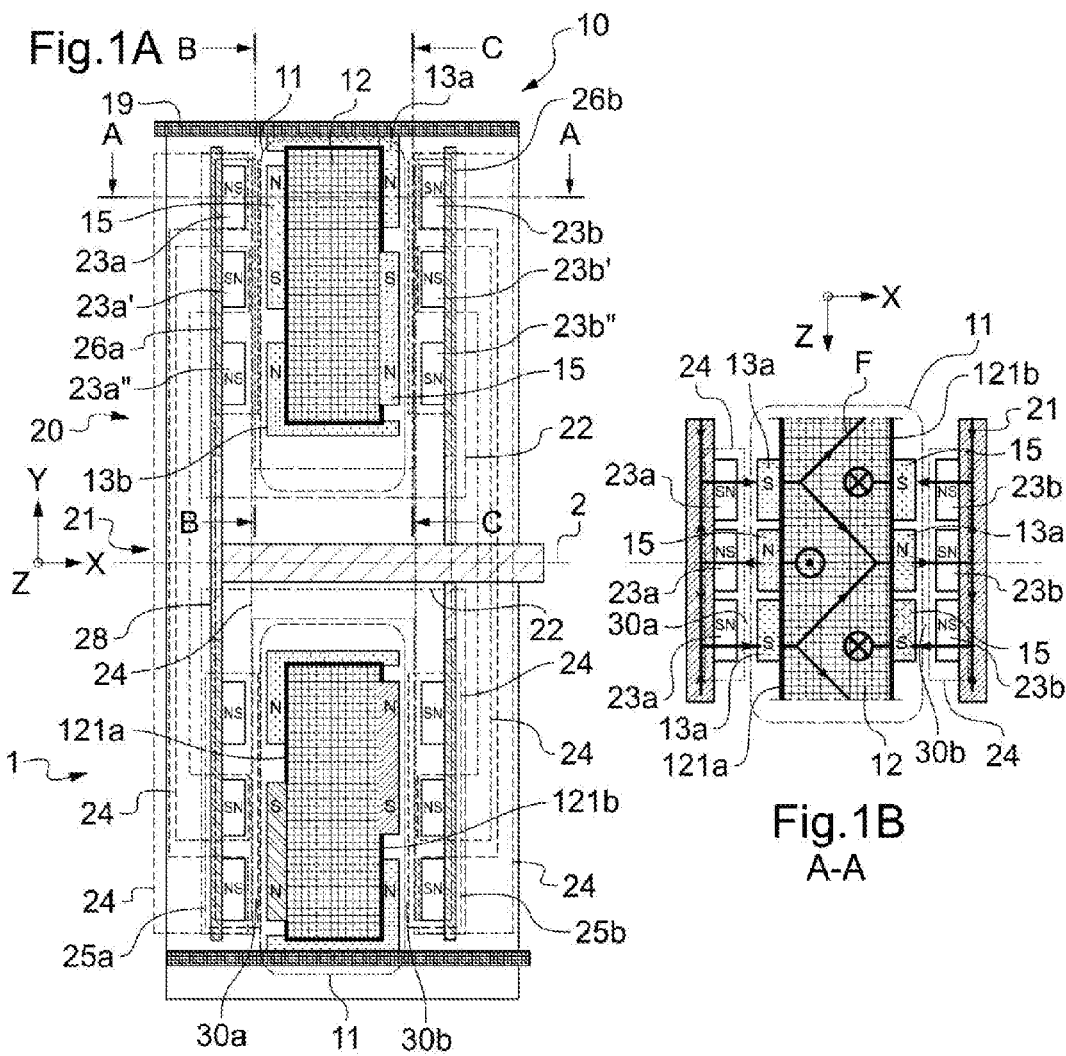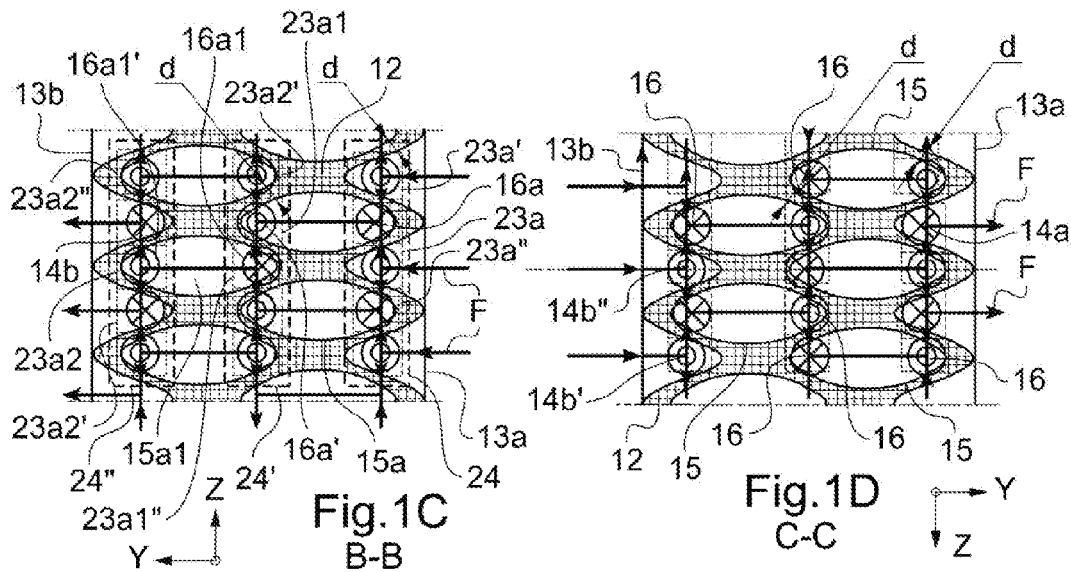

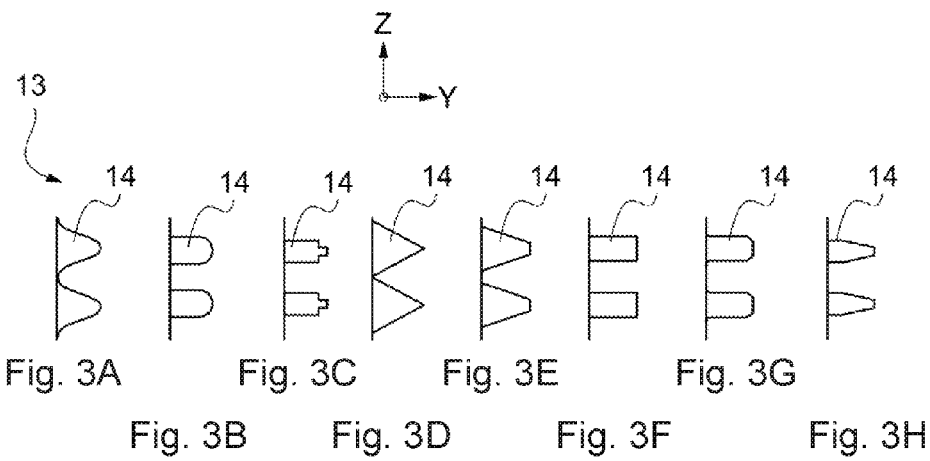
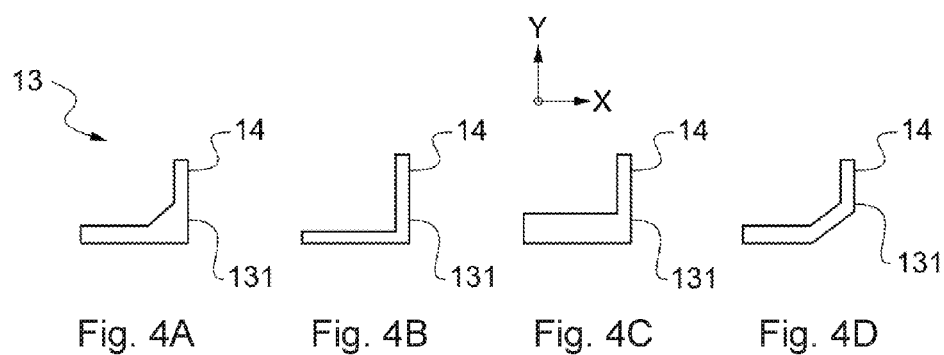
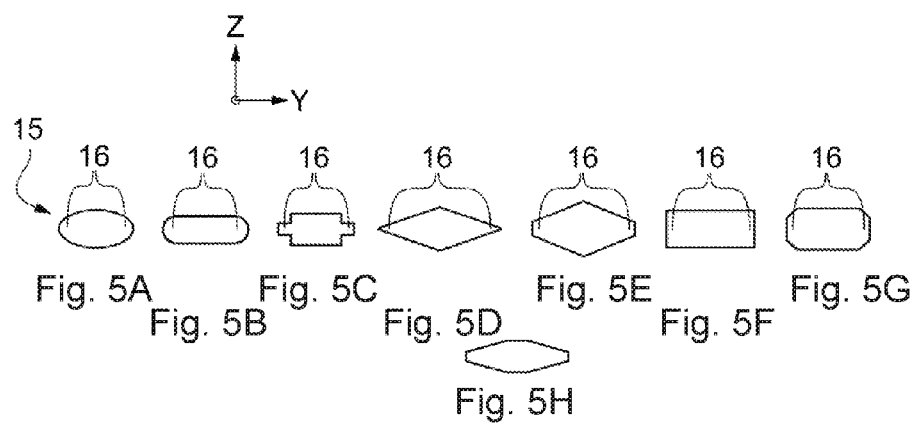

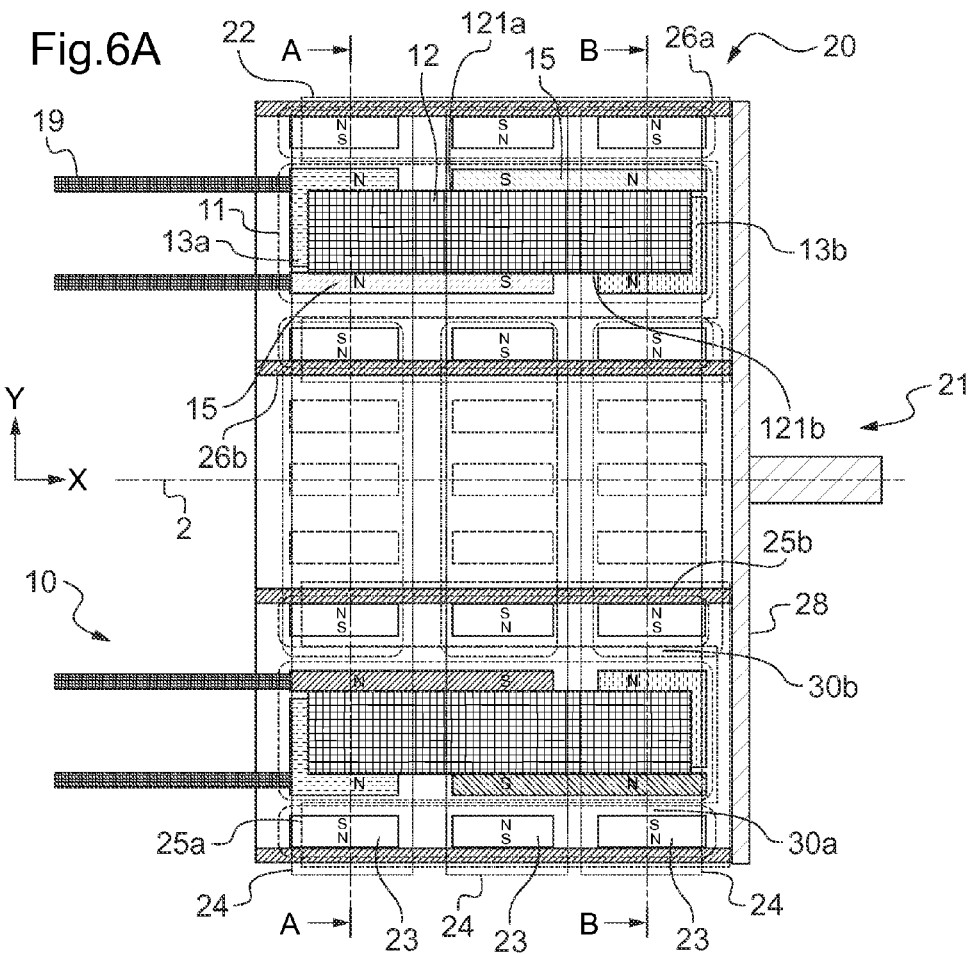
Fig.6A
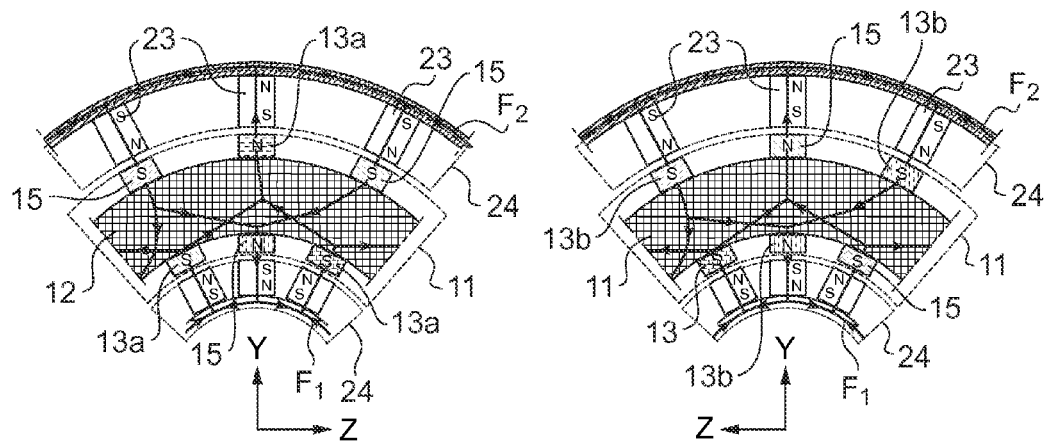
Fig.6B
A-A
Fig.6C
B-B

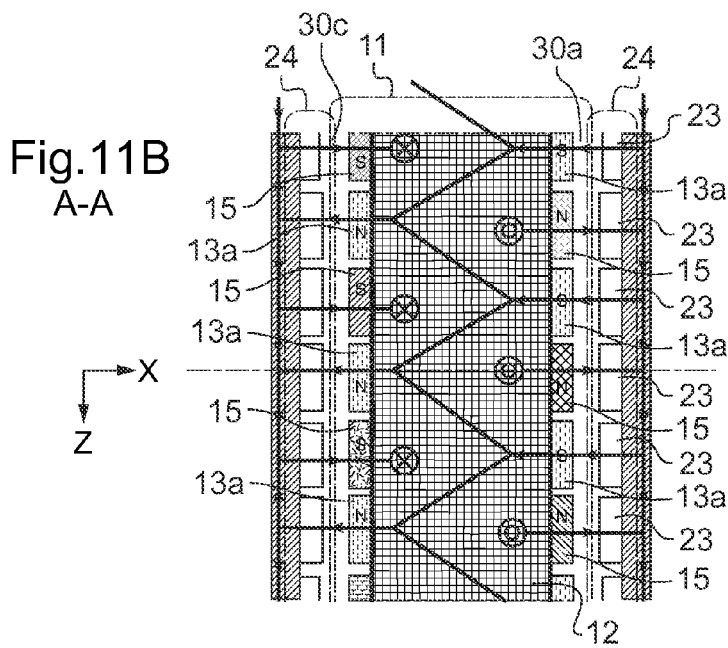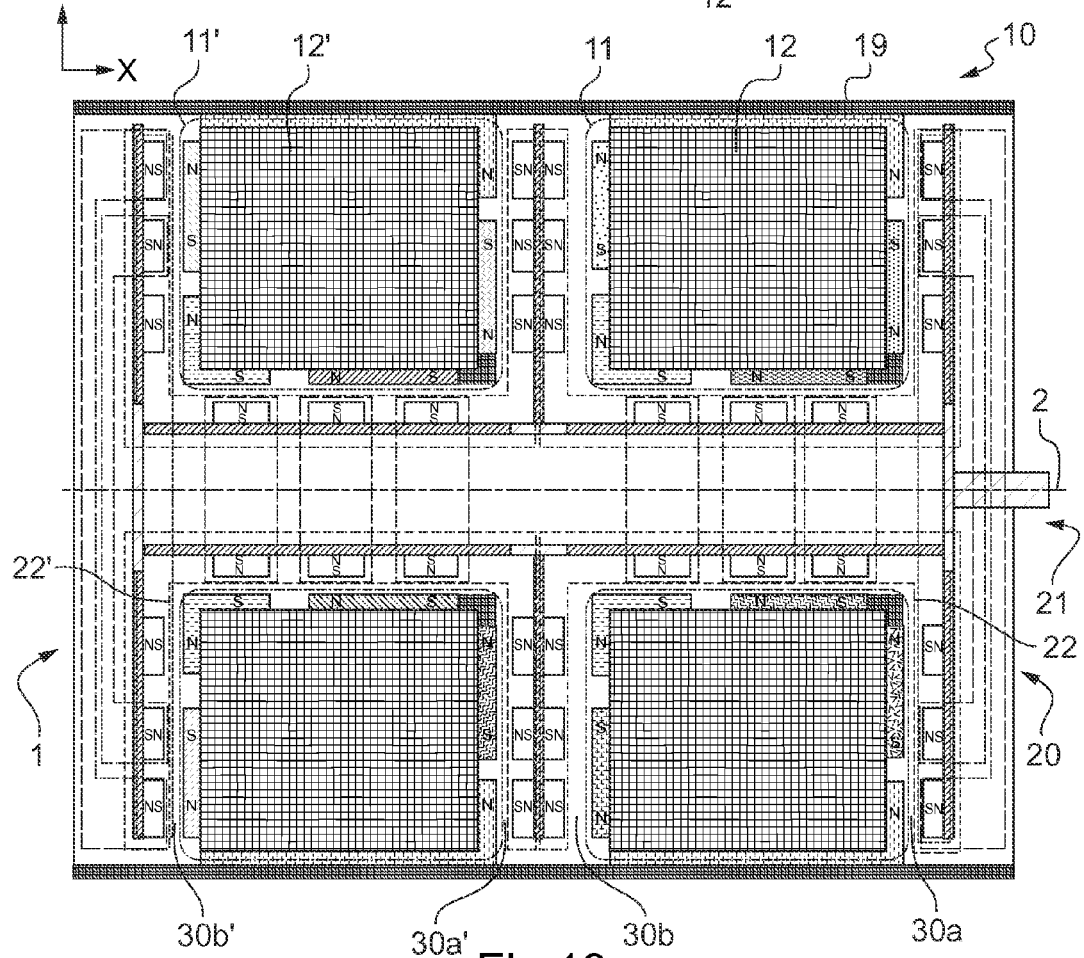

A-A

ELECTRIC MACHINE WITH INTERMEDIATE PIECES HAVING MULTIPLE AIR GAPS AND A 3D MAGNETIC FLUX

CROSS-REFERENCE TO RELATED APPLICATIONS

This application claims priority to French Patent Application No. FR 13 00031 filed Jan. 9, 2013, the disclosure of which is incorporated in its entirety by reference herein.

BACKGROUND OF THE INVENTION (1) Filed of the Invention

The present invention lies in the area of electric machines. It relates to a reversible electric machine with intermediate pieces having multiple air gaps and a 3D magnetic flux. Such an electric machine may be monophase or polyphase.

(2) Description of Related Art

An electric machine that converts electrical energy into mechanical energy—for example, for the propulsion of a vehicle—is called a "motor". An electric machine that converts mechanical energy into electrical energy—for example, for the generation of an electric current—is called a "generator". Among generators, a distinction can be drawn between alternators, which supply an alternating electric current, and dynamos, which supply a direct electric current.

An electric motor may be adapted in order to be fed by a direct electric current or by a monophase or polyphase alternating electric current, such as a three-phase electric current. Similarly, an alternator may be adapted to generate a monophase or polyphase alternating electric current.

However, a polyphase alternating electric current must be balanced in order to allow smooth and fluid operation of the electric machine. Such a balanced polyphase alternating electric current, thus forming a balanced electrical system, includes at least three phases and is characterized, in particular, by the fact that the sum of the complex voltages (or currents) of each phase is null, while the amplitude of the voltage (or current) of each phase is not simultaneously null. Moreover, an identical phase shift is present between each phase of this current.

An electric machine is said to be reversible when it can be simultaneously used as a motor and a generator. Any electric machine can be reversible, with the distinction between the motor and generator functions being made only with regard to the purpose and the use of this electric machine. The term "motor-generator" is also used if both functions are available on the electric machine.

The motors currently in use may be rotary (that is, producing angular displacement and/or torque) or linear (producing linear displacement and/or a force).

On the other hand, generators are essentially rotary.

A rotating electric machine is an electromechanical device that includes at least one stator that is fixed and at least one rotor that rotates with respect to the stator, and which can be located inside or outside the stator. The rotation of this rotor is generated by the interaction between two magnetic fields that are attached to this stator and the rotor respectively, thus creating a magnetic torque on the rotor. Thus, the phrases "stator magnetic field" and "rotor magnetic field" are used respectively.

Because the remainder of this description will be limited to rotating electric machines, for the sake of simplicity the term "electric machine" will be used to designate a rotating electric machine. Similarly, the term "electric motor" will designate a rotating electric motor, and the term "generator" will designate a rotating electric generator.

The various electric machine technologies are distinguished essentially by the way in which the stator and rotor magnetic fields are generated.

For example, in a direct-current electric motor, the stator includes magnetic elements, which may be permanent magnets or non-permanent magnets, more commonly known as electromagnets, and which typically consist of one or more windings of electric conductors supplied with a direct electric current. The term "coil" will be used in this document to designate a set of one or more windings of electric conductors. In both cases, each magnet includes two poles (a north pole and a south pole), and a fixed stator magnetic field is thus created. Conversely, the rotor includes non-permanent magnets consisting of a coil that creates a rotational magnetic field when a direct electric current passes through it. When this rotor rotates, a rotating collector makes it possible to reverse the direction of this direct electric current passing through the rotor coil at least once per rotation, thus reversing the poles of the non-permanent magnets of this rotor and thereby modifying the direction of the rotor magnetic field.

Thus, a shift between the stator and rotor magnetic fields causes a magnetic torque on the rotor, with, for example, a north pole of the stator repelling a north pole of the rotor and attracting a south pole of the rotor. Consequently, a rotation of the rotor with respect to the stator is generated.

A principal disadvantage of such a direct-current electric motor resides in the electrical contacts that are necessary between the rotor coil and the rotating collector. These contacts, which are obtained for example by means of brushes, can create electric arcs that in particular cause wear, and parasitic currents that consequently require frequent maintenance schedules for the electric machine. Furthermore, this type of electric motor is not suitable for high rotation speeds, and consumes energy due to friction, thereby reducing its performance. Finally, it can be complex to implement.

These disadvantages have been eliminated thanks to brushless-motor technology, also known as "brushless motors".

The rotor of such an electric machine includes one or more permanent magnets, while the stator includes a coil consisting of non-permanent magnets. Such a machine may also include means for determining the position of the rotor (for example, through the use of a sensor), as well as an electronic control system that ensures the switching of the electric current. An alternating electric current then circulates within the stator coil. Thus, this electronic control system makes it possible to ensure the orientation and the direction of the stator magnetic field with respect to the rotor magnetic field, and consequently the rotation of the rotor with respect to the stator, with the rotating stator field engaging the rotor field.

Furthermore, within the stator coil, one or more windings may be grouped in order to form different stator phases, with each phase having an identical phase shift with respect to the other phases. In motor mode, each phase is fed by one phase of a polyphase alternating electric current and, respectively, generates a stator magnetic field, with each stator magnetic field that is associated with a phase likewise being shifted with respect to the other stator magnetic fields that are associated with the other phases. The stator magnetic fields, when they are derived from a single polyphase electric current forming a balanced electric system, add up to form a single stator magnetic field, known as a "stator resultant", which rotates at a synchronous frequency. This stator resultant then causes the rotation of the rotor field, and consequently creates a rotation of the rotor with respect to the stator.

Similarly, in generator mode, the rotation of the rotor causes the rotation of the rotor field and the creation of a rotating stator resultant, which is decomposed into one magnetic field for each phase of the stator, thus generating the appearance of a polyphase alternating electric current.

Among electric machines that use alternating electric current, a distinction can be drawn between synchronous and asynchronous electric machines.

Synchronous electric machines, which include brushless motors, have a rotor that includes one or more permanent magnets and a stator that includes a coil provided with multiple windings that may form one or several phases. In fact, when one or more of the alternating electric currents of a balanced polyphase electric system pass through them, the windings of the stator coil create one or more rotating stator magnetic fields, whose stator resultant engages the rotor magnetic field at the synchronous frequency of the machine, thereby causing the rotation of the rotor.

Conversely, a rotation of the rotor, generated by an external mechanical force, creates a rotation of the rotor magnetic field, which causes the creation of one or more rotating stator magnetic fields forming the stator resultant, and, consequently, the appearance and the circulation of one or more alternating electric currents in the stator coil.

The permanent rotor magnets may be replaced by a coil that is fed by a direct electric current, forming non-permanent magnets and thus creating a rotor magnetic field. The direct electric current may be delivered by an electric current generator, such as a battery or a capacitor.

The rotational frequency of the rotor of a synchronous electric motor is proportional to the frequency of the alternating electric current applied to the stator. Similarly, the frequency of the alternating electric current generated in a synchronous generator is proportional to the rotational frequency of the rotor. The synchronous machine is often used as a generator, for example, as an alternator in electric power stations.

Asynchronous electric machines have a rotor that includes a coil whose windings are short-circuited and a stator that includes a coil, forming non-permanent magnets. In fact, when an alternating electric current passes through this stator coil, it creates one or more rotating stator magnetic fields, whose stator resultant causes the appearance of a rotor electric current in the rotor coil, thereby generating a magnetic torque on this rotor and, consequently, the rotation of this rotor with respect to the stator.

Conversely, a rotation of the rotor generated by an external mechanical force will cause the appearance and the circulation of an alternating electric current in the stator coil. In order for this to occur, the electric machine must be connected to a network that includes, for example, at least one inverter and one battery, in order to supply it with the reactive energy that is necessary for its operation in generator mode.

Although the rotational frequency of the stator magnetic field is proportional to the frequency of the alternating electric current passing through the stator coil, the rotational frequency of the rotor of an asynchronous electric motor is not necessarily proportional to this frequency of the alternating electric current, because a slip rate may appear between the rotor and the stator magnetic field. Similarly, the frequency of the alternating electric current generated in an asynchronous generator is not necessarily proportional to the rotational frequency of the rotor.

For a long time, asynchronous machines were used only as electric motors, for example, in the transportation field, to drive ships and trains, as well as in the industrial area for machine tools. Thanks to the use of power electronics, such electric machines are also used today as generators—for example, in wind turbines.

Furthermore, the use of such reversible electric machines on board vehicles, such as automobiles or rotary-wing aircraft, is being developed for the implementation of a hybrid motor installation using two types of energy (both thermal and electrical) to drive the vehicle. However, the use of these electric machines today is limited by certain constraints, such as the power-to-weight ratio of the machines and of the electric-energy storage means.

Regardless of the type of reversible electric machine, a magnetic flux circulates between the rotor and the stator through the various permanent or non-permanent magnets of this rotor and of this stator, and this flux is channeled by the magnetic poles of these magnets. In fact, this magnetic flux circulates from a north pole to a south pole across the air gap located between each pole of the stator and of the rotor, as well as between a south pole and a north pole in the vicinity of the stator and of the rotor.

Furthermore, the rotor magnets—whether they are permanent or non-permanent, may be oriented in two ways, thus leading to at least three types of electric machines.

On the one hand, the magnets may be oriented perpendicular to the axis of rotation of the electric machine, that is, with the two poles of each magnet oriented perpendicular to this axis of rotation. These magnets are said to be radially oriented, or are simply referred to as radial magnets. A radial magnetic flux is thus created in the vicinity of these magnets, i.e., perpendicular to this axis of rotation. Thus, the air gap in the vicinity of these magnets is arranged to lie parallel to this axis of rotation.

On the other hand, the magnets may be oriented parallel to the axis of rotation of the electric machine—that is, with the two poles of each magnet oriented parallel to this axis of rotation. These magnets are said to be axially oriented, or are simply referred to as axial magnets. An axial magnetic flux is thus created in the vicinity of these magnets, i.e., parallel to this axis of rotation. Thus, the air gap in the vicinity of these magnets is located perpendicular to this axis of rotation.

These various orientations of the magnets make it possible to orient the magnetic flux that circulates inside the electric machine, which, in a first type of electric machine (for example, a disc-rotor electric machine) is axial; or, in a second type of electric machine (for example, a cylindrical-rotor electric machine), is radial. For a third type of electric machine, both radial and axial magnets may be used in the same electric machine, such that a magnetic flux is created that is simultaneously radial and axial. This type of magnetic flux is referred to as a "multiple air-gap magnetic flux". Conversely, regardless of the orientation of the magnets, a single magnetic flux circulates throughout the electric machine.

Contemporary electric machines use various configurations and orientations of the magnetic flux, that is, a radial or axial magnetic flux, in order better to meet the customer's needs, in terms of both performance and dimensions. For example, machines with permanent magnets and a strongly coupled axial flux are shorter axially and larger radially, whereas machines with a radial flux are small radially and long axially.

Furthermore, the power-to-weight ratio of these electric machines—namely, the ratio of their power to their mass— and their manufacturing cost will vary depending on the magnetic-flux configurations that are used, without necessarily being optimal.

Electric machines with prongs and permanent magnets are the most desirable type today, thanks to a high performance/cost ratio in comparison with other machine technologies, particularly because of the use of permanent magnets; the use of a soft, pressed and baked magnetic alloy (i.e., a soft magnetic compound) instead of the assembly of laminated sheets; and the use of axial coils, as well as because they involve a limited number of parts. The use of a soft, pressed and baked magnetic alloy, which notably possesses isotropic characteristics in all three directions, enables the manufacture of complex three-dimensional shapes. However, the power-to-weight ratio is not optimal, because these electric machines use only one orientation of the magnetic flux created from the magnetic field generated by the stator operating in motor mode. In fact, this magnetic flux circulates essentially radially or axially with respect to the axis of the machine. Thus, using this technology, in order to have high torque machines it would be necessary to increase either the radius (for radial machines) or the length (for axial machines) of the air gap, which would result in large and heavy machines. Thus, this technology does not use all of the possibilities for the orientation of the magnetic flux, and does not allow the creation of high torque electric machines that are also compact and light.

The prior art also includes document EP 0613229, which describes a direct-current brushless motor that includes a stator and a rotor. The rotor consists of a circular rotor yoke provided with multiple magnetic poles whose north poles and south poles are arranged in alternation. The stator includes two assembled circular stator yokes, within which a coil is located. Each stator yoke includes bent tabs, with one bent tab of each stator yoke located alternately opposite a magnetic pole of the rotor yoke, thus forming an air gap. Furthermore, when an alternating electric current passes through the coil, the coil magnetizes the bent tabs of each stator yoke, alternately forming a north pole and a south pole. Thus, these different magnetic poles, which are present on the stator and the rotor, make it possible to generate a rotational motion of the rotor. This document describes various ways of ensuring accurate and stable angular positions between the two stator yokes.

Meanwhile, FR 2828027 describes a machine with a homopolar structure that includes a stator and a rotor. The stator includes one or more circular yokes, each of which consists of two identical, angularly indexed crowns, inside of which a coil is located. Each crown includes bent tabs that alternately form a north pole and a south pole when an electric current passes through the coil. When the stator includes multiple yokes, these yokes are separated by a spacer made of a non-magnetic material. Furthermore, in a polyphase motor, each coil may be connected to a different phase.

Meanwhile, EP 1770846 describes an electric machine with a radial flux that includes a stator and a rotor. The rotor includes permanent magnets, while the stator includes one or more circular yokes, each of which consists of two identical, angularly indexed crowns, inside of which a coil is located. Each crown is made of a magnetic powder that is compacted along the direction of the axis of rotation of the crown, and includes prongs that alternately form a north pole and a south pole when an electric current passes through the coil. Three yokes that are phase shifted by 120° are assembled and insulated by an insulating resin, such that a stator for a three-phase electric machine is formed.

Moreover, WO 2004/107541 describes a transverse-flux electric machine that includes a stator and a rotor. The stator includes a coil and two circular yokes located at each end of this coil. Each yoke includes C shaped tabs that are bent on the circumferential surface of the coil, along with a multitude of conductive parts located on this circumferential surface and distributed uniformly between the C shaped tabs, thus forming several rows along the axial direction of the electric machine. The rotor includes a multitude of magnets that are likewise arranged in several rows along the axial direction of the electric machine, thereby facing each C shaped tab and each conductive part of the stator, forming an air gap with them. When an alternating electric current passes through the coil, the C shaped tabs and the conductive parts are magnetized, and a magnetic flux then circulates radially between the rotor magnets, on the one hand, and the C shaped tabs and the conductive parts of the stator, on the other hand, thereby generating a rotational movement of the rotor.

The prior art also includes CN 101212150, which describes a dual-air-gap electric machine that includes a stator and a rotor. The rotor includes two groups of magnets, with one group being positioned radially and the other group being positioned axially facing the axis of rotation of the electric machine. Similarly, the stator includes a coil and two groups of magnetic poles, with one group being positioned facing radial magnets of the rotor, thereby creating a radial magnetic flux, and with the other group being positioned facing axial magnets of the rotor, thereby creating an axial magnetic flux. In fact, a dual air gap that is both radial and axial is created between the rotor and the stator. The magnetic poles of the stator and of the rotor consist of circumferentially alternating north and south poles. Conversely, an adjacent radial pole and an adjacent axial pole are identical. Thus, the magnetic flux that circulates in the electric machine can divide, in order to pass radially and axially through the dual air gap and circulate between the poles of the stator and of the rotor, then recombine in the vicinity of the stator and of the rotor.

Lastly, FR 2961037 and FR 2959621 relate to a homopolar electric machine that includes a rotor and a stator that has one or more phases. The rotor includes multiple permanent magnets, and each phase of the stator consists of a coil and a yoke provided with alternating magnetic poles, with each yoke being formed by two crowns. More specifically, FR 2961037 describes the shape of the teeth carried by each crown, with each crown forming each magnetic pole of the stator, thereby enabling the optimization of the circulation of the magnetic flux. In fact, such a tooth shape allows the magnetic flux to circulate maximally in the magnetic circuit, which consists, among other things, of the stator yoke, thereby limiting both its circulation in air and magnetic leakage. Meanwhile, document FR 2959621 describes how to perform the angular indexing of the yokes constituting each phase of this homopolar electric machine, by using an intermediate disk located between each yoke. Each intermediate disk includes index fingers that cooperate with holes located in each yoke, in order to ensure the angular offset corresponding to each phase.

BRIEF SUMMARY OF THE INVENTION

Thus, the goal of the present invention is to offer an electric machine that makes it possible to overcome the above-mentioned limitations, in order to improve the use of the magnetic field that is generated in the vicinity of the stator, thereby enhancing the performance of such an electric machine, including, in particular, its power-to-weight ratio, thanks to the presence of at least two air gaps and the circulation of a magnetic flux in three dimensions.

According to the invention, an electric machine includes an axis of rotation, a stator equipped with an armature and at least one annular exciter unit, as well as a rotor revolving about the axis of rotation and equipped with a structure and at least one annular receiver unit. The rotor may be internal and/or external with respect to the stator—that is, such that the rotor turns inside or outside the stator, but one part of the rotor may also turn inside the stator while another part of the rotor turns outside the stator. Each exciter unit includes one coil, at least two annular yokes, and a plurality of intermediate pieces, with the coil being positioned inside the yokes and having at least two faces, where these yokes include a plurality of first teeth and each intermediate piece consists of two extremities that form two second teeth. Each receiver unit includes a plurality of magnets and cooperates with a single exciter unit, with each magnet having a first north pole and a first south pole. The total number of magnets is equal to the total number of first and second teeth present on the yokes.

Each exciter unit and each receiver unit have an annular shape around about the axis of rotation of the electric machine. Each yoke also has an annual shape about this axis of rotation, so that the set of yokes encloses the coil of each exciter unit.

This coil may be composed of one or more windings of electrical conductors. When an electric current passes through this coil, the first teeth of each yoke and the second teeth of the intermediate pieces are magnetized in order to form the second north and south magnetic poles.

The yokes, as well as the rotor structure, primarily in the areas in which the magnets are located, are made of a ferromagnetic material that allows the magnetic flux to be conducted with no Foucault current losses. For example, the yokes may be made of a soft magnetic steel alloy in powder form that is pressed and baked and/or machined. They may also be made of stacked steel sheets or assembled steel pieces.

The armature of the stator is made of a non-magnetic material such as aluminum, fiberglass, or carbon fiber, resin, or plastic. Such materials do not conduct the magnetic flux, and therefore prevent magnetic-flux short circuits and, consequently, magnetic leakage.

This electric machine is noteworthy in that each yoke includes at least two sides, two of which are extreme sides, and the first teeth of each yoke are distributed on these two extreme sides and angularly, in a regular manner, about the axis of rotation on each extreme side. These two extreme sides constitute the two ends of the yoke, with other optional sides, referred to henceforth as "intermediate sides", being located between these two extreme sides. Furthermore, the intermediate pieces are located on at least one annular row on at least two of the faces of the coil between the first teeth of two yokes.

These intermediate pieces are arranged on each face of the coil in such a way that a first extremity of each intermediate piece on a first row fits between two first teeth of a yoke, maintaining a distance between each second tooth, which distance is formed by the first extremities of each intermediate piece and two first teeth of this yoke. Then a second extremity of each intermediate piece on a row fits between two first extremities of two intermediate pieces on a next row, maintaining a distance between each second tooth, which distance is formed by the second extremities and two first teeth formed by these first extremities. Finally, a second extremity of each intermediate piece on the last row fits between two first teeth of the other yoke of this face of the coil, maintaining a distance between each second tooth, which distance is formed by the second extremities and two first teeth of this other yoke.

This distance is preferably constant and identical, regardless of whether it is between each intermediate piece or between each intermediate piece and the yokes. This distance is sufficient to maintain magnetic isolation, so as to avoid a magnetic short circuit between each intermediate piece and between each intermediate piece and the yokes, thereby making it possible to limit or even eliminate magnetic-flux leakage.

Depending on whether the number of rows of intermediate pieces is odd or even, the first teeth of two yokes are positioned head-to-tail or else face-to-face on the same face of the coil, alternately forming second north poles and second south poles. The first teeth of two yokes are positioned head-to-tail on one face of the coil when they are angularly offset so as to fit into each other.

Furthermore, the first teeth of two yokes and the second teeth of the intermediate pieces form, alternately on these faces of the coil, second north poles and second south poles, such that two adjacent first poles have opposite polarities, with each intermediate piece including a north pole and a south pole.

Each receiver unit includes at least two series of magnets, with each series consisting of at least two rows of magnets, which magnets are distributed angularly in a regular manner about the axis of rotation. Each magnet has a first pole positioned facing the exciter unit, and, more specifically, facing one of the faces of the coil on which the intermediate pieces are located, with the other first pole being positioned facing the rotor structure. Each row is arranged in such a way that two adjacent first poles have opposite polarities, with each row consisting of an alternation of first north poles and first south poles. Each series is positioned facing one of the faces of the coil on which the intermediate pieces are positioned, with the number of rows of magnets being equal to the number of rows of intermediate pieces on this face of the coil plus one unit. In fact, each row of magnets cooperates with the second poles formed by the first teeth of a yoke and a second tooth of each intermediate piece in a row, or by a second tooth of each intermediate piece in two adjacent rows. Thus, a series facing one face of the coil should include a number of magnets that is equal to the number of second poles that are present on this face—that is, the number of second teeth of the intermediate pieces on this face and the number of first teeth of two yokes.

Furthermore, inside a receiver unit, each row of magnets is linked, either directly or by means of a ferromagnetic material, to the rotor structure, which itself is made of a ferromagnetic material. Moreover, each row of magnets in a series may be isolated magnetically from the other rows of magnets in this series, in order to prevent, in particular, magnetic leakage or exchanges of magnetic flux between these rows. For example, such magnetic isolation may be achieved by means of a non-magnetic material.

Similarly, each series of magnets of a receiver unit may be isolated magnetically from the other series of magnets in this receiver unit, in order to prevent magnetic leakage or exchanges of magnetic flux between these rows. For example, such magnetic isolation may be achieved by means of a non-magnetic material.

Thus, an air gap is formed between each series of magnets and the exciter unit, and the magnetic flux circulating inside the electric machine can divide and recombine itself in the vicinity of each magnet in a single given row of the rotor and of each stator yoke.

In fact, depending on the number of yokes enclosing the coil of the exciter unit (which number is preferably from two to four), and on the way in which these yokes enclose this coil, the yokes may include two, three, or four sides, two of which are extreme sides, with the optional presence of one or two intermediate sides. The first teeth of each yoke are distributed on these two extreme sides. Furthermore, in order to enclose the coil, two extreme sides of two adjacent yokes are placed on the same face of the coil, and the intermediate pieces are located on at least one row between the first teeth of these two yokes, with the second teeth of the intermediate pieces fitting into each other as well as between the first teeth of these two yokes, while maintaining a distance between them.

Furthermore, when an electric current passes through the coil, each first tooth and each second tooth are magnetized in order to form, in alternation, a second north pole and a second south pole on the faces of the coil, with two adjacent second poles having opposite polarities.

Thus, a yoke includes first teeth on its two extreme sides, with these first teeth being capable of being distributed in different ways between these two extreme sides.

According to a first yoke geometry, the first teeth of the two extreme sides of a yoke are distributed angularly in a regular manner about the axis of rotation and in alternation on the two extreme sides. Thus, each first tooth of an extreme side is located between two first teeth of the other extreme side of this yoke, with the two extreme sides having, for example, shapes that are equivalent to two signals of opposite phase.

According to a second yoke geometry, the first teeth of the two extreme sides of a yoke are positioned face to face, with the two extreme sides thus having shapes that are equivalent to two in-phase signals.

In addition to these two specific yoke geometries, the first teeth of one extreme side of a yoke may also occupy any of the intermediate positions between a position face-to-face with a first tooth of the other extreme side and a position between two first teeth of the other extreme side. That is, the teeth may have any offset between a first tooth of one extreme side and a first tooth of the other extreme side. Conversely, these first teeth must always have the same offset between a first tooth of one extreme side and a first tooth of the other extreme side of each yoke, as well as the same shape and the same dimensions.

Likewise, the second teeth of each intermediate piece have the same shape as the first teeth of the yokes, in particular so that these second teeth fit between the first teeth of the yokes.

Moreover, the first teeth of each yoke and the second teeth of each intermediate piece can cover each coil face in a more or less significant manner.

According to a first coverage pattern, the extremity of each second tooth of the last row of the intermediate pieces does not extend beyond the face of the coil on which these intermediate pieces are located. Furthermore, each intermediate side of the yoke (when the yoke has one) extends beyond the face of the coil on which it is located.

Conversely, according to a second coverage pattern, the extremity of each second tooth of the last row of the intermediate pieces does extend beyond the face of the coil on which these intermediate pieces are located. That is, these second teeth extend just as far as the outer face of the yoke with which they fit. Furthermore, each intermediate side of the yoke (when the yoke has one) does not extend beyond the face of the coil on which it is located.

This second coverage pattern advantageously makes it possible for the first and second teeth to have a larger surface area, with, consequently, a larger air gap. Accordingly, the torque and the power-to-weight ratio of the electric machine according to the invention are greater for identical dimensions of the electric machine.

Furthermore, the magnets of each receiver unit are distributed in such a way that their first poles cooperate with the corresponding second poles of an exciter unit. For this purpose, these magnets are distributed over at least two series of at least two rows of magnets, with each series being positioned facing one of the faces on which the intermediate pieces are positioned.

Each row of magnets consists of an alternation of the first north poles and of the first south poles, with each first pole being located facing a first tooth of a yoke or a second tooth of an intermediate piece. Consequently, an air gap is formed between each row of magnets and the exciter unit.

Indeed, this specific distribution of the first poles on each receiver unit of the rotor, and of the second poles of the yokes of the stator, as well as the respective positions of the poles with respect to at least two faces of the coil of each exciter unit, allow this electric machine according to the invention to operate in a particular way.

In fact, a magnetic flux circulates from a north pole to a south pole, doing so through the air gap between the stator and the rotor, whereas this magnetic flux circulates from a south pole to a north pole in the stator and the rotor. The electric machine according to the invention has first poles and second poles with alternating polarities, which poles are distributed over at least two faces of the coil of an exciter unit. Furthermore, the alternation of the second magnetic poles and the positioning of a second tooth of an intermediate piece between two first teeth of a yoke make it necessary to have two adjacent first teeth on a given extreme side having the same polarity, with the two extreme sides of a yoke thus having opposite polarities.

Thereafter, the magnetic flux circulating in the electric machine can divide in each yoke after a second south pole, moving from at least two second south poles of each yoke toward at least two second north poles, and recombining before reaching a second north pole of this yoke.

Similarly, in the rotor, the magnetic flux may divide after each magnet of this rotor, moving from at least two magnets of this rotor toward at least two other magnets of this rotor, and recombining before reaching each magnet of the rotor.

Conversely, because each intermediate piece is magnetically isolated from each other piece, the magnetic flux can neither divide nor recombine when passing through these intermediate pieces.

For example, according to the first yoke geometry, one first tooth of an extreme side, corresponding to a second south pole, is located between two first teeth of the other extreme side of this yoke, corresponding to two second north poles. That is, the one first tooth is equidistant from the two nearest second north poles.

Thus, the magnetic flux circulating in the electric machine has a tendency, after this second south pole of the yoke, to divide primarily and equivalently, between these two nearest second north poles. A small part of this magnetic flux may also move toward other second north poles of this yoke.

Then, before reaching each second north pole of each yoke, this magnetic flux recombines, coming primarily and in an equivalent manner from two second south poles of this yoke.

In the case of the second yoke geometry, a first tooth of an extreme side, corresponding to a second south pole, is located facing a first tooth of the other extreme side, corresponding to a second north pole. That is, the first tooth is located near a single second north pole, with two other second north poles thus being equidistant from this second south pole, but at a greater distance from it.

Thus, the magnetic flux circulating in the electric machine has a tendency, after this second south pole of the yoke, to move primarily toward this nearest second north pole. However, this magnetic flux may also divide, and part of this magnetic flux may move toward other second north poles of this yoke, and particularly toward the two second north poles enclosing the second north pole located facing the second south pole from which the magnetic flux is coming.

Then, before reaching each second north pole, this magnetic flux recombines, primarily when coming from this second south pole that is nearest to this second north pole, and optionally, when coming from two other second south poles of this yoke enclosing this second south pole.

Lastly, in the other intermediate yoke geometries between the two specific geometries, a first tooth of an extreme side of a yoke, corresponding to a second south pole, is always closer to a single first tooth of the other extreme side, corresponding to a second north pole, with another first tooth, corresponding to another second north pole, optionally being present at a slightly greater distance.

Indeed, the magnetic flux circulating in the electric machine has a tendency, beyond this second south pole of the yoke, to move primarily toward this nearest second north pole. However, this magnetic flux may also divide, and a more or less sizable portion of this magnetic flux may move toward one or more other second north poles of this yoke.

Then, upon reaching each second north pole, this magnetic flux recombines, primarily when coming from this second south pole that is nearest to this second north pole, and, optionally, when coming from one or more other second south poles of this yoke.

In the vicinity of the rotor, the magnetic flux circulates over a single row of magnets, without a direct exchange with other rows. Indeed, regardless of the yoke geometry and number of rows of intermediate pieces, because the magnets are distributed angularly, in a regular manner, about the axis of rotation of the rotor, the magnetic flux circulates in an identical manner inside the rotor. Thus, after having passed from the stator and through a first magnet of the rotor, the magnetic flux is divided primarily and equivalently between two magnets of the same row located on either side of this first magnet. However, a small portion of this magnetic flux may also move toward other magnets in this row on the rotor.

It is nonetheless possible that a part of the magnetic flux could pass directly from one row to the other. In order to prevent this phenomenon, it is necessary to magnetically isolate each row of magnets from the other rows of a series, for example by using a non-magnetic material positioned between each row of magnets of a series.

Then, before passing through an air gap toward the stator, this magnetic flux is recombined upon arrival at each magnet of one row, coming primarily and equivalently from two magnets of this row.

Furthermore, the presence of at least one row of intermediate pieces permits this magnetic flux to circulate from one part through a first air gap by making at least one round trip between the exciter unit and a series of magnets of the receiver unit, and more precisely, between the first poles and the second poles, before continuing through the one yoke toward another coil face, then through another air gap, once again carrying out at least one round trip between the exciter unit and another series of magnets of the receiver unit.

Furthermore, each yoke, whose first teeth are distributed over at least two faces of the coil of an exciter unit, permit the magnetic flux to circulate from one face of the coil to another face of this coil—that is, from at least one second south pole to at least one second north pole of a yoke, and then from one series of magnets of a receiver unit toward another series of magnets of this same receiver unit. Indeed, this magnetic flux, which circulates over at least two faces of the coil of each exciter unit, can be thought of as having a three-dimensional path. Thus, one can speak of a "3D magnetic flux" circulating in the electric machine according to the invention.

Advantageously, using the intermediate pieces and distributing the first teeth of each yoke and the second teeth of these intermediate pieces over at least two coil faces of each exciter unit permits an increase in the number of second magnetic poles attached to this exciter unit while keeping the same coil and using the same diameter of the air gap and the same dimensions. Similarly, increasing the number of yokes (that is, using at least two yokes) likewise makes it possible to increase the number of second magnetic poles attached to this exciter unit.

Accordingly, the electric machine according to the invention makes it possible to optimize the use of the magnetic field generated in the vicinity of each exciter unit by multiplying the number of second poles, and thus increasing the surface area and the number of air gaps, or even using it in an optimal manner by means of four yokes, with the first teeth of these yokes and the second teeth of the intermediate pieces being located on the four faces of the coil.

Thus, the multiplicity of the number of second magnetic poles for each exciter unit and of the number of first magnetic poles for each receiver unit, and the increase in the number of air gaps and the circulation of a 3D magnetic flux, make it possible to enhance the performance of the electric machine according to the invention, while preserving an equivalent volume and mass, and without making its management more complex.

Thus, the performance of such an electric machine—including, in particular, its torque—is improved, and its power-to-weight ratio is noticeably increased. In fact, when the number of magnetic poles of each exciter unit is multiplied by two, three, or four, the torque of the electric machine is likewise multiplied by two, three, or four, while its dimensions remain unchanged, with only its mass undergoing a slight increase due to the presence of the additional magnetic poles. Indeed, the power of such an electric machine is significantly increased in exchange for a slight increase in its mass, such that its power-to-weight ratio is noticeably increased.

According to a first embodiment of the invention, each exciter unit includes two yokes, and the two extreme sides of these two yokes are positioned head-to-tail on two faces of the coil, and the intermediate pieces are positioned on these two faces of the coil between the yokes.

Furthermore, each receiver unit includes two series of at least two rows of magnets positioned facing the two faces of the coil on which the intermediate pieces are positioned. Thus, two air gaps are formed between each receiver unit and each exciter unit.

According to this first embodiment of the invention, the two yokes have the same offset between each tooth of one extreme edge and each tooth of the other extreme edge.

More specifically, the two yokes are identical when the intermediate pieces are positioned on two opposite faces of the coil.

According to a second embodiment of the invention, each exciter unit includes three yokes, and the two extreme sides of these three yokes are positioned on three faces of the coil, and the intermediate pieces are positioned on these three faces of the coil between the yokes.

Furthermore, each receiver unit includes three series of at least two rows of magnets positioned facing the three faces of the coil on which the intermediate pieces are positioned. Thus, three air gaps are formed between each receiver unit and each exciter unit.

According to a third embodiment of the invention, each exciter unit includes four yokes, and the two extreme sides of these four yokes are positioned on four faces of the coil, and the intermediate pieces are positioned on these four faces of the coil between the yokes.

Furthermore, each receiver unit includes four series of at least two rows of magnets positioned facing the four faces of the coil on which the intermediate pieces are positioned. Thus, four air gaps are formed between each receiver unit and each exciter unit.

Each yoke is usually composed of a single annular piece. However, when a yoke does not have an intermediate side and the second teeth of the intermediate pieces are arranged according to the second coverage pattern, the yoke may be composed of a plurality of pairs of first teeth, with one first tooth in this pair being located on each extreme side. In particular, when a yoke implements the second geometry, both of the teeth in this pair of teeth are located face to face, respectively, on each extreme side. Thus, these pairs of teeth are not linked to each other, and therefore are magnetically isolated from each other. Similarly, the first teeth of the yoke that are located on the same extreme side are likewise isolated from each other. In this case, the 3D magnetic flux circulates only through this pair of first teeth, from one first tooth on one extreme side toward the first tooth on the other extreme side. Thus, this 3D magnetic flux cannot divide and recombine on this yoke. Conversely, this 3D magnetic flux can always divide and recombine in the vicinity of the magnets of the rotor, and, optionally, may also do so in the vicinity of one or more yokes that include at least one intermediate side.

The magnets of each receiver unit are preferably permanent magnets. In fact, they do not require any power, and have a substantial power-to-weight ratio. However, the magnets of each receiver unit may be non-permanent magnets. For example, they may consist of a coil to which direct current is supplied, or else may consist of a short-circuit coil.

Thus, an electric machine according to the invention may constitute, particularly as a function of this choice for the magnets of each receiver unit, a synchronous or asynchronous electric machine.

Moreover, the two extreme sides of each yoke, as well as the intermediate pieces, may be positioned perpendicular to the axis of rotation of the electric machine according to the invention, thus cooperating with axial magnets so as to create an axial magnetic flux in the air gaps. These two extreme sides and the intermediate pieces may also be positioned parallel to this axis of rotation, thus cooperating with radial magnets so as to create a radial 3D magnetic flux in the air gaps.

A yoke may also have one extreme side positioned perpendicular to the axis of rotation of the electric machine, and one extreme side positioned parallel to this axis of rotation, cooperating respectively with axial and radial magnets, with the 3D magnetic flux thus circulating in the air gaps in a multi-air-gap manner, namely, both axially and radially.

Indeed, when an exciter unit includes at least three yokes, the 3D magnetic flux circulates in a multi-air-gap manner in the electric machine according to the invention.

Conversely, when an exciter unit includes only two yokes, the 3D magnetic flux may circulate axially, radially, or in a multi-air-gap manner. In fact, if the two extreme sides of each yoke and the intermediate pieces are located on two opposite faces of the coil of the exciter unit, the 3D magnetic flux will circulate either axially or radially, depending on whether these faces are perpendicular or parallel to the axis of rotation. Conversely, if the two extreme sides of each yoke and the intermediate pieces are located on two adjacent faces of the coil of the exciter unit, the 3D magnetic flux will then circulate in a multi-air-gap manner in the electric machine.

This choice of an axial, radial, or multi-air-gap magnetic flux affects the dimensions of the electric machine and therefore may be made for reasons, among others, involving the dimensional criteria of the electric machine. This choice may also affect the inertia of the rotor, and thus the rotational speeds of the electric machine.

In order to improve the performance of the electric machine according to the invention, including, in particular, its torque, multiple exciter units may be associated on the stator, in which case the rotor will include an equivalent association of receiver units, so that one receiver unit of the rotor cooperates with just one exciter unit of the stator.

The exciter units may be associated axially in relation to the axis of rotation of the electric machine, such that the exciter units form a line that is parallel to this axis of rotation. Similarly, the exciter units may be associated radially in relation to the axis of rotation of the electric machine, such that the exciter units form a line that is perpendicular to this axis of rotation. Lastly, these two association options may be combined so as to obtain, for example, subassemblies of axially associated exciter units. These subassemblies may also be combined radially.

Furthermore, identical exciter units (that is, exciter units that include the same number of yokes) may be associated. However, different exciter units (that is, exciter units that include different numbers of yokes) may similarly be associated. The important thing is that one exciter unit cooperates with one receiver unit whose number of series of magnets corresponds to the number of yokes of this exciter unit.

Conversely, magnetic leakage may occur between each pair formed by an exciter unit and a receiver unit. These magnetic leaks cause a reduction in the performance of the electric machine, particularly in its torque.

In order to avoid these magnetic leaks, each pair consisting of an exciter unit and a receiver unit must be magnetically isolated, for example, by means of a non-magnetic material. In fact, the use of a non-magnetic material separating each exciter unit or each receiver unit is sufficient to isolate the 3D magnetic fluxes of each pair consisting of an exciter unit and a receiver unit, and to limit the risk of magnetic leakage.

Furthermore, in order to reduce the dimensions of such an electric machine, as well as its number of components, multiple exciter units can be associated, with each exciter unit being separated only by a yoke. This yoke is then used jointly by two exciter units. However, this architecture of the electric machine is possible only with the first coverage pattern of the teeth on each face of the coil, in which the extremity of each tooth does not extend beyond the face of the coil. In this case, the receiver units may be magnetically isolated in order to avoid, in particular, magnetic leakage, and in order to allow loop-type circulation of the magnetic flux between one exciter unit and one receiver unit. Consequently, because the magnetic leaks are limited, the power-to-weight ratio of the electric machine is optimized.

Conversely, the second coverage pattern of the teeth on the faces of the coil makes such an architecture impossible without the presence of significant and unacceptable magnetic leakage between the pairs consisting of one exciter unit and one receiver unit.

In motor operating mode, the set of exciter units of such an electric machine may be powered by a single monophase electric current.

Similarly, in generator operating mode, such an electric machine then provides a monophase electric current.

It is also possible to power one or more of these exciter units using different phases of a balanced polyphase electric current. In this case, each phase of the balanced polyphase electric current is shifted in relation to the other phases of this current. A shift must also be present within the electric machine according to the invention between the different receiver units. This shift between the receiver units is, in a known manner, a function of the shift between the phases of the balanced polyphase electric current and the number of magnetic poles of each receiver unit.

Similarly, in generator operating mode, such an electric machine then provides a balanced polyphase electric current.

In order to optimize the performance of the electric machine according to the invention, it is important to facilitate the movement of the 3D magnetic flux, not only when it passes through each air gap but also when it circulates in the rotor and stator.

In fact, the shape of each yoke is important, with regard to the first teeth and also with regard to the link between the first teeth, as well as with regard to the shape of the second teeth of the intermediate pieces. First of all, the teeth may have a variety of different shapes, such as a triangle, trapezoid, or a rectangle. The optimal shape, which allows, on the one hand, good magnetization of the first teeth by the exciter unit so as to form the second magnetic poles, and, on the other hand, a good transfer of the 3D magnetic flux through each air gap toward the first poles of the rotor, is a so called "wave", which in fact corresponds to a regular sine wave. However, this shape is difficult to implement, particularly through the use of a manufacturing method, such as steel-powder compaction, that is typically employed for such parts of electric machines. In fact, the peaks of the waves lack homogeneity, and their effectiveness is reduced.

The first teeth will preferably have a flat "cat's-tongue" shape, or else a so called "stairway" shape, which makes it possible to achieve a good compromise between the effectiveness of these shapes and their manufacture, particularly via steel-powder compaction.

Similarly, the second teeth of the intermediate pieces may also have these same shapes, i.e., a triangle, a trapezoid, or a rectangle. The second teeth will preferably have a flat "cat's-tongue" shape, or else a so called "stairway" shape, although the optimal shape is a so called "wave".

Next, in order to allow good circulation of the 3D magnetic flux in each yoke, it is important not to have any areas of saturation of this 3D magnetic flux, especially at the base of each first tooth. For this purpose, a connecting fillet may be added at the base of the first teeth, in the vicinity of the joint between the extreme side and the next side of this yoke; or else the cross-sections of the yoke in this area may be modified. A connection in the form of a chamfer is preferably created at base of each first tooth.

Furthermore, the rotor structure is made of a material that is ferromagnetic primarily in the areas in which the rows of magnets are located, so as to allow the circulation of the magnetic flux between each magnet located in these rows. Indeed, the parts of the structure where no rows of magnets are located may be made of a non-magnetic material.

Furthermore, certain parts of this structure may allow the magnetic isolation, on the one hand, of each series of magnets of a receiver unit in relation to the other series of magnets of this receiver unit, and, on the other hand, of each receiver unit in relation to the other receiver units of the electric machine. For example, such magnetic isolation may be achieved by means of a non-magnetic material.

Advantageously, the non-magnetic materials typically have a lower density than the ferromagnetic materials. Indeed, the use of a non-magnetic material makes it possible to reduce the weight of the rotor of the electric machine, and, consequently, its moment of inertia, thereby contributing toward an improvement in the performance of the electric machine according to the invention.

BRIEF DESCRIPTION OF THE SEVERAL VIEWS OF THE DRAWINGS

The invention and the advantages associated with it will appear in greater detail in the following description that includes implementations provided solely as illustrative examples with reference to the attached figures, which are described as follows.

FIGS. 1A to 1D show various views of a first embodiment of the electric machine according to the invention;

FIGS. 3A to 3H and 4A to 4D show the possible shapes of the yokes;

FIGS. 5A to 5H show the possible shapes of the intermediate pieces;

FIGS. 6A to 6C and 7 to 10 show variants of this first embodiment;

FIGS. 11A and 11b show various views of a second embodiment of the electric machine according to the invention;

FIGS. 13 and 14 show variants of this second embodiment;

DETAILED DESCRIPTION OF THE INVENTION

Figure 2A:
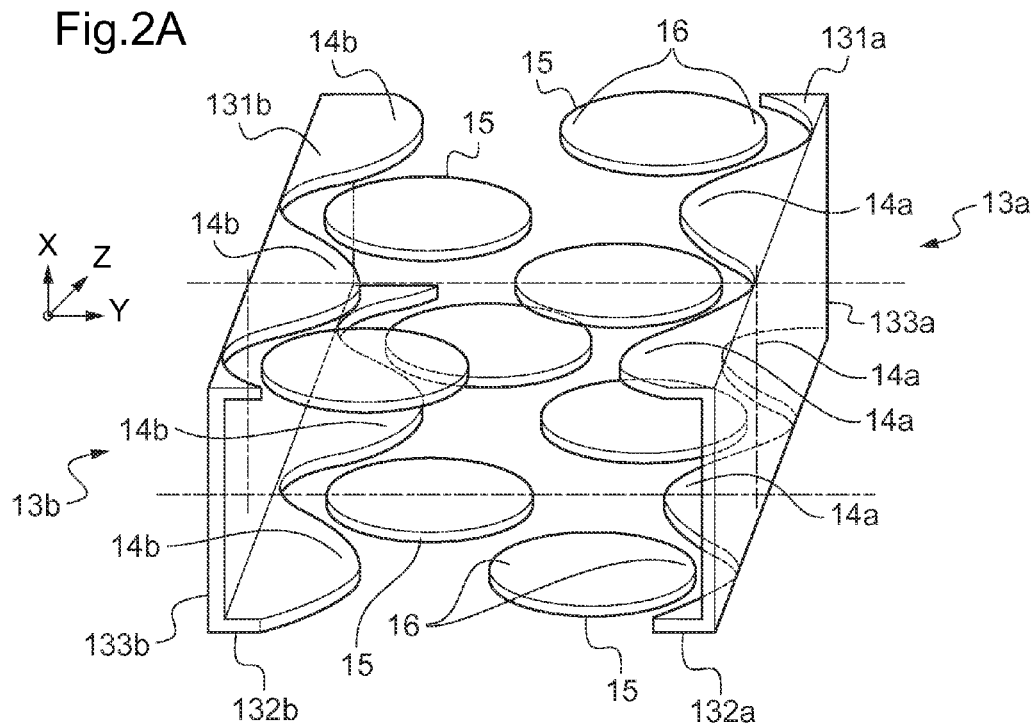
FIGS. 2A to 2C show various views of the yokes and placement of the intermediate pieces of this first embodiment.

Elements shown in a number of different figures are indicated by the same reference number.

It should be noted that three mutually orthogonal directions, X, Y, and Z, are shown in certain figures.

The first direction X is known as the axial direction. The term "axial" applies to any direction that is parallel to the first direction X.

Directions Y and Z are known as radial directions. The term "radial" applies to any direction that is perpendicular to the first direction X.

FIG. 1 shows a first embodiment of an electric machine 1 that relates to the invention. According to FIG. 1A, such an electric machine 1 includes an axis of rotation 2, a stator 10 and a rotor 20 that revolves about the axis of rotation 2 and inside the stator 10.

The rotor 20 includes a structure 21 and an annular receiver unit 22 equipped with two series 25a, 25b of magnets 23, with each series 25a, 25b having three rows 24 of magnets 23, and with each magnet 23 having a first north pole and a first south pole. Each row 24 is thereby made up of alternating first north poles and first south poles, with the magnets 23 of the rows 24 being positioned so that two adjacent magnets 23 have opposite polarities.

This structure 21 of the rotor 20 includes two first parts 26a, 26b on which the two series 24a, 24b of magnets 23 are respectively positioned, and a second part 28 that allows the fastening of these two first parts 26a, 26b.

The stator 10 includes an armature 19 and an annular exciter unit 11 equipped with a coil 12, and two identical annular yokes 13a, 13b, as well as a plurality of intermediate pieces 15. Part of these yokes 13 is shown in FIG. 2A, along with the placement of these intermediate pieces 15. Each yoke 13 includes three sides, of which two are extreme sides 131, 132 and one is the intermediate side 133, with each extreme side 131, 132 including a plurality of first teeth 14 that are distributed angularly in a regular manner about the axis of rotation 2. Each intermediate piece 15 includes two extremities that form two second teeth 16. The coil 12 is positioned inside the two yokes and the intermediate pieces 13a, 13b in order to form an exciter unit 11.

The armature 19 of the stator 10 as well as the second part 28 of the structure 21 of the rotor 20 are implemented as a non-magnetic material. For example, they can be made of aluminum. The yokes 13 and the intermediate pieces 15, as well as the first parts 26a, 26b of the structure 21 are made of a ferromagnetic material, a soft magnetic alloy, pressed and baked and/or machined (Soft Magnetic Compound), for example. The yokes 13 and the intermediate pieces 15 can be supported around the coil 12 by a non-metallic and non-magnetic material, for example by a solid carbon fiber coating. The two first parts 26a, 26b of the structure 21 are isolated magnetically from one another by the second part 28 of this structure 21. Notably, the use of the second part 28 of the structure 21, which is made from a non-magnetic material, notably allows for a reduction in the mass of the rotor 20, and consequently its moment of inertia.

The first teeth 14 of the two yokes 13 are positioned on two faces 121a, 121b of the coil 12, and the intermediate parts 15 are positioned in two annular rows on these two faces 121a, 121b, between the first teeth 14 of the two yokes 13a, 13b, as shown in FIGS. 1C and 1D. These two figures represent the two sections B-B and C-C respectively along the two faces 121a, 121b.

A first extremity of each intermediate piece 15 fits between two first teeth 14 of a yoke 13, maintaining a distance d between the second tooth 16, which distance is formed by this first extremity of each intermediate piece 15 and two first teeth 14. Similarly, a second extremity of each intermediate piece 15 on a row fits between two second extremities of each intermediate piece 15 on another row, maintaining a distance d between the second teeth 16, which distance is formed by these second extremities.

Figure 2B:
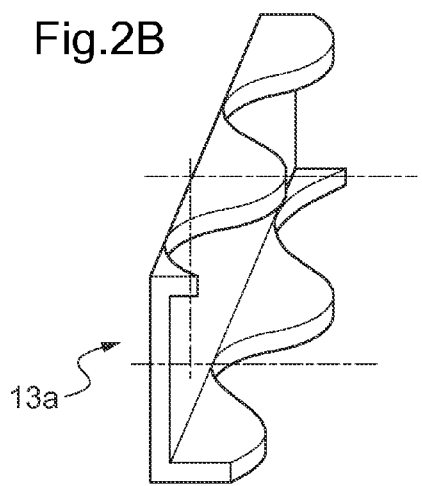

Furthermore, each first tooth 14 of an extreme side 131 of a yoke 13 is located between two first teeth 14 of the other extreme side 132 of this yoke 13, according to a first geometry of the yoke 13. The two extreme sides 131, 132, for example, have shapes that are equivalent to two signals of opposite phase, as shown in FIG. 2B.

However, these first teeth 14 can be distributed differently between the two extreme sides 131, 132, but these first teeth 14 must always have the same angular distribution about the axis of rotation 2 of the rotor 20 on each extreme side 131, 132 of each yoke 13, as well as the same shape and the same dimensions.

Figure 2C:
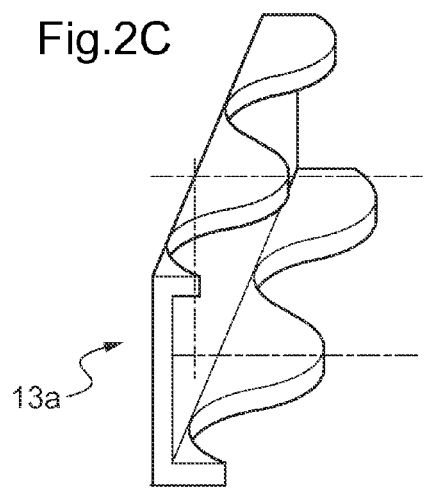

For example, each first tooth 14 of an extreme side 131 of a yoke 13 is situated facing a first tooth 14 of the other extreme side 132 of this yoke 13 according to a second yoke geometry 13. The two extreme sides 131, 132 thus have shapes that are equivalent to two signals in phase, as shown in FIG. 2C.

The first teeth 14 of an extreme side 131 of a yoke 13 can likewise take on any intermediate positions between a position opposite a first tooth 14 of the other extreme side 132 and a position between two first teeth 14 of the other extreme side 132.

Moreover, the first teeth 14a, 14b of each yoke 13a, 13b and the second teeth 16 of each intermediate piece 15 may cover, to a greater or lesser extent, each face 121a, 121b of the coil 12.

According to a first coverage pattern that corresponds to the coverage pattern used in the electric machine 1 shown in FIG. 1, the extremity of each second tooth 16 of the first and last row of the intermediate pieces 15 does not extend beyond the face 121a, 121b of the coil 12 on which these intermediate pieces 15 are located. That is, these second teeth 16 stop just before the yoke 13a, 13b with which they fit. Moreover, each intermediate side 133a, 133b of the yoke 13 extends beyond the face 121a, 121b of the coil 12 on which it is located. The yokes 13a, 13b and the intermediate pieces 15 that constitute this first coverage pattern are shown in FIGS. 1 and 2.

However, according to a second coverage pattern, the extremity of each second tooth 16 of the first and last row of the intermediate pieces 15 may extend beyond the face 121a, 121b of the coil 12 on which these intermediate pieces 15 are located. That is, these second teeth 16 extend just as far as the outer face of the yoke 13a, 13b with which they fit. In this case, each intermediate side 133a, 133b of the yoke does not extend beyond the face 121a, 121b of the coil 12 on which it is located.

Furthermore, when an exciter unit 11 includes an even number of intermediate pieces 15, the first teeth 14 of the two yokes 13 are positioned head-to-tail on the same face of the coil 12.

The number of intermediate pieces 15 shown in the figures is non-limitative, and an exciter unit 11 according to the invention may include at least one row of intermediate pieces 15.

Thus, when an exciter unit 11 includes an odd number of intermediate pieces 15, the first teeth 14 of the two yokes 13 are then positioned face-to-face on the same face of the coil 12.

The receiver unit 22 cooperates with the exciter unit 11, with each series 25a, 25b of magnets 23 being positioned facing the exciter unit 11 in such a way that each magnet 23 has a first pole positioned facing one of the faces 121a, 121b onto which the intermediate pieces 15 fit, with the other first pole being positioned facing a first part 26a, 26b of the structure 21 of the rotor 20. Thus, the first magnetic poles cooperate with the second magnetic poles, and two air gaps 30a, 30b are formed between the receiver unit 22 and the exciter unit 11—more specifically, between each series 25a, 25b of magnets 23 and each face 121a, 121b.

Moreover, the total number of magnets 23 is equal to the total number of first teeth 14 and second teeth 16.

Indeed, during operation in motor mode, when an alternating electric current passes through the coil 12, each first tooth 14 is magnetized, alternately forming second north poles and second south poles on each face 121a, 121b.

Consequently, a magnetic flux F circulates in the electric machine 1 as shown in FIGS. 1B, 1C, and 1D. This magnetic flux F thus circulates from a first north pole of the rotor 20 toward a second south pole of the stator 10, then from a second north pole of the stator 10 toward a first south pole of the rotor 20, thereby making several round trips between the exciter unit 11 and the receiver unit 22.

Furthermore, the magnetic flux F can divide in each yoke 13a, 13b after a second south pole, moving from at least two second south poles of this yoke 13a, 13b toward at least two second north poles, and recombining before reaching a second north pole of this yoke 13a, 13b.

Similarly, in the rotor 20, the magnetic flux F may divide after each magnet 23 of this rotor 20, moving from at least two magnets 23 of this rotor 20 toward at least two other magnets 23 of this rotor 20, and recombining before reaching each magnet 23 of the rotor 20.

More specifically, as shown in FIG. 1C, the magnetic flux F circulates first along the face 121a of the coil 12. This magnetic flux F moves from a first tooth 14a of a first yoke 13a, which constitutes a second north pole, toward a first south pole of a first magnet 23a in a first row 24. After having passed through this magnet 23a, the magnetic flux F can then divide in the structure 25a of the rotor 10, and move in an equivalent manner toward two magnets 23a', 23a" in this first row 24. Before reaching each of these magnets 23a', 23a", the magnetic flux F, coming from two magnets 23 in this first row 24, is recombined before circulating in each magnet 23a', 23a", and then passes through the air gap 30a.

The magnetic flux F then reaches a second tooth 16a of a first intermediate piece 15a, which tooth constitutes a second south pole, with this first intermediate piece 15a belonging to a first row of intermediate pieces 15. Next, the magnetic flux F moves toward the second tooth 16a' of this first intermediate piece 15a, which tooth constitutes a second north pole, and passes through the air gap 30a toward the first south pole of a second magnet 23a1 in a second row 24'. After having passed through this magnet 23a1, the magnetic flux F then divides again in the structure 25a, and moves in an equivalent manner toward two magnets 23a1', 23a1" in this second row 24'. Before reaching each of these magnets 23a1', 23a1", the magnetic flux F, coming from two magnets 23 in this second row 24', is recombined before circulating in each magnet 23a1', 23a1", and then passes again through the air gap 30a.

The magnetic flux F then reaches a second tooth 16a1 of a second intermediate piece 15a1, which tooth constitutes a second south pole, with this second intermediate piece 15a1 belonging to a second row of intermediate pieces 15. Next, the magnetic flux F moves toward the second tooth 16a1' of this second intermediate piece 15a1, which tooth constitutes a second north pole, and passes through the air gap 30a toward the first south pole of a third magnet 23a 2 in a third row 24". After having passed through this magnet 23a 2, the magnetic flux F divides in the structure 25a of the rotor 10, and moves in an equivalent manner toward two magnets 23a2', 23a2" in this third row 24". Before reaching each of these magnets 23a'2, 23a2", the magnetic flux F, coming from two magnets 23 in this third row 24", is recombined before circulating in each magnet 23a', 23a", and then passes through the air gap 30a.

The magnetic flux F then reaches a first tooth 14b of the second yoke 13b of the face 121a of the coil 12, which tooth constitutes a second north pole, and then moves toward another face 121b of the coil 12, dividing itself, as shown in FIG. 1B. The magnetic flux F then moves in an equivalent manner toward two first teeth 14b', 14b" of this second yoke 13b. Then, before reaching each of these first teeth 14b', 14b", the magnetic flux F, coming from two first teeth 14b of this second yoke 13b, recombines and then passes through the air gap 30a.

Lastly, the magnetic flux F1 restarts a similar circulation cycle on the face 121b, continuing as far as the next yoke 13a, as shown in FIG. 1D.

Likewise, while operating in the generator mode, the rotation of the rotor 20 causes the magnetization of the teeth 14 of the yokes 13, and consequently the circulation of a magnetic flux F. An alternating electric current thus appears in the exciter unit 11.

In order to permit good circulation of this magnetic flux F, the first teeth 14 and the second teeth 16 may have different shapes, including either sharp edges or radii of curvature. Examples of these shapes of the first teeth 14 and of the second teeth 16 are shown in FIGS. 3 and 5, respectively. The optimal shape of these first teeth 14 and of the second teeth 16 is a "wave", which actually corresponds to a regular sine wave, as shown in FIGS. 3A and 5A; however, this shape is difficult to implement on an industrial scale. The first and second teeth 14, 16 will preferably have a flat "cat's-tongue" shape, or else a so called "stairway" shape, as shown in FIGS. 3B, 3C and 5B, 5C, respectively. These shapes allow a good compromise to be achieved between the effectiveness of these shapes and their manufacture, particularly through the compaction of powdered steel. FIGS. 3D to 3H and 5D to 5H show various other shapes.

Moreover, in order to permit good circulation of the magnetic flux F in the stator 10, and more particularly in each yoke 13, the section of the yoke 13 at the base of each tooth 14 should be defined with attention paid to the space between each extreme side 131, 132 and the intermediate side 133. In effect, a shape that is not well adapted could lead to saturation of the magnetic flux F in the yoke 13, and consequently to a loss of performance in the electric machine 1. Examples of these sections of the yoke 13 are shown in FIG. 4, with the preferred section of the yoke 13 being a chamfered section according to FIG. 4A. FIGS. 4B to 4D show various other yoke shapes.

In the electric machine 1 shown in FIG. 1A, the magnets 23 are axial, i.e., the two poles of each magnet 23 are oriented parallel to the axis of rotation 2, where the first teeth 14 and the second teeth 16 are positioned perpendicular to the axis of rotation 2 of the electric machine 1. Consequently, the two air gaps 30a, 30b are perpendicular to this axis of rotation 2. Actually, the magnetic flux F is axial, meaning that it circulates axially, i.e., parallel to the axis of rotation 2. The electric machine 1 shown in FIG. 1A is thus an electric machine with a 3D axial magnetic flux.

FIG. 6 is a variant of the first embodiment of the invention. According to FIG. 6A, such an electric machine 1 includes, as previously, an axis of rotation 2, a stator 10 and a rotor 20 that revolves about the axis of rotation 2 and inside and outside of the stator 10.

The rotor 20 has a structure 21 and an annular receiver unit 22 equipped with two series 25a, 25b of three rows 24 of magnets 23, having a first series 24a located outside the stator 10 and the exciter unit 11, and a second series 25b located inside the stator 10 and the exciter unit 11. This structure 21 of the rotor 20 includes two first parts 26a, 6b on which the two series 25a, 25b of magnets 23 are respectively positioned, and a second part 25 that allows the fastening of these two first parts 26a, 26b.

The stator 10 includes an armature 19 and an annular exciter unit 11 that is equipped with a coil 12, two annular yokes 13a, 13b, and intermediate pieces 15. The two faces 121a, 121b of the coil 12 on which the first teeth 14 of the two yokes 13 and the second teeth 16 of the intermediate pieces 15 are positioned are parallel to the axis of rotation 2.

Moreover, the yokes 13a, 13b according to the first geometry are each tooth 14 of an extreme side 131 of a yoke 13 being located between two teeth 14 of the other extreme side 132 of this yoke 13, and according to the second coverage pattern, i.e., that the extremity of each second tooth 16 of the second row of intermediate pieces 14 extends beyond the face 121a, 121b of the coil 12.

In this variant, the magnets 23 are radial, i.e., the two poles of each magnet 23 are oriented perpendicular to the axis of rotation 2 of the electric machine 1. Consequently, the two air gaps 30a, 30b are parallel to this axis of rotation 2. The magnetic flux F de facto circulates radially, i.e., it circulates perpendicular to the axis of rotation 2. The electric machine 1 shown in FIG. 6A is thus an electric machine with a 3D radial magnetic flux.

The magnetic flux F circulates in the electric machine 1 as shown in FIGS. 6B and 6C, and in the same manner as described previously.

FIGS. 7 to 10 show other variants of the first embodiment of the invention comprising a plurality of exciter units 11 and a plurality of receiver units 22, thereby permitting an increase in performance of the electric machine 1, notably its torque.

Figure 7:
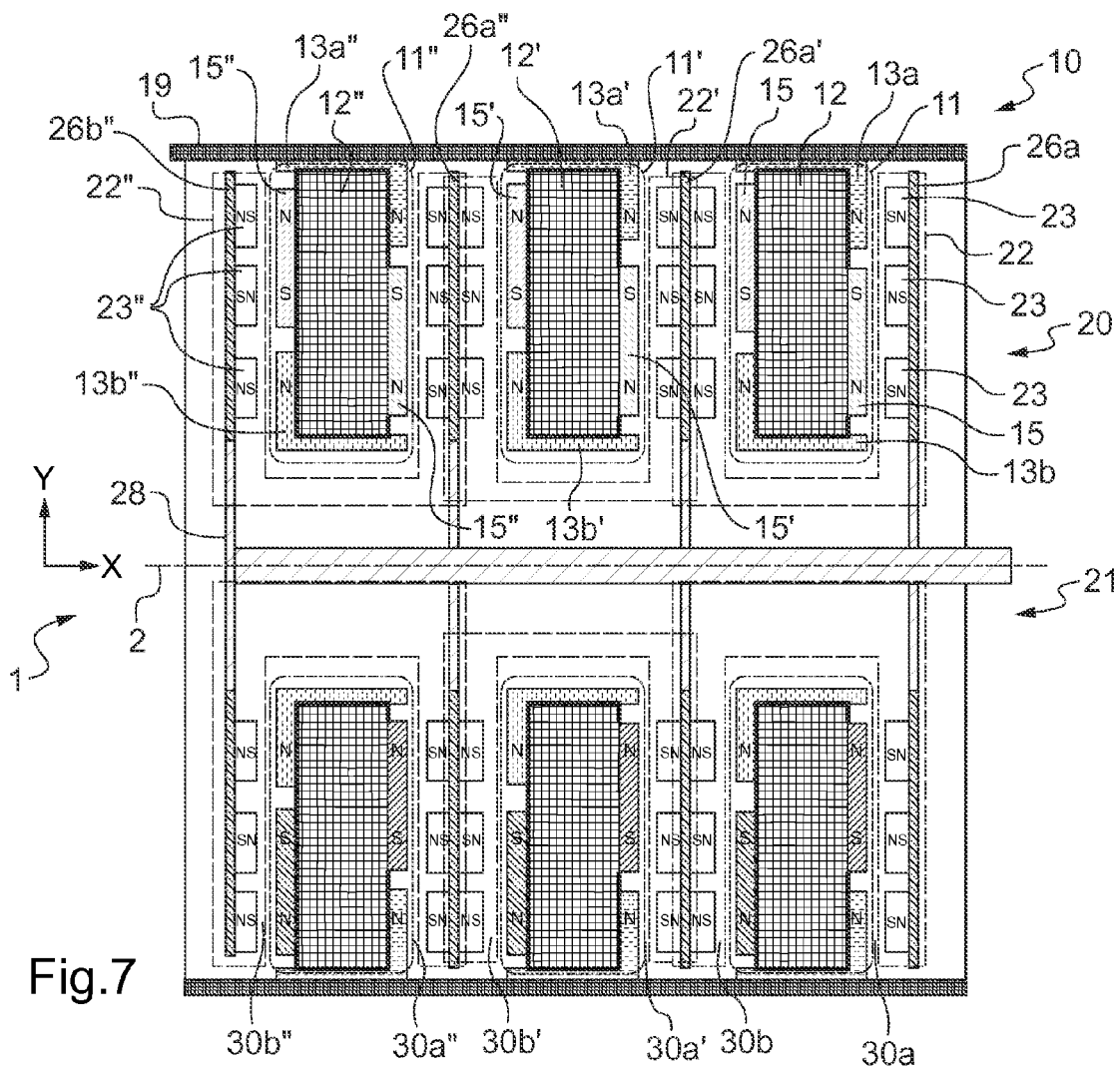

FIG. 7 shows an electric machine 1 with an axial 3D magnetic flux including three exciter units 11, 11', 11" and three receiver units 22, 22', 22". This variant actually consists of three electric machines with an axial 3D magnetic flux, as shown in FIG. 1A, that were associated to form a single electric machine 1. This association is implemented axially, with the three exciter units 11, 11', 11" forming a line parallel to the axis of rotation 2. The rotor 20 of this variant is inside the stator 10 so that the rotor 20 revolves inside the stator 10, but this rotor 20 could likewise be external with respect to the stator 10.

The three exciter units 11, 11', 11" are separated from each other by the armature 19 and function independently of each other, with an axial 3D magnetic flux circulating simultaneously in each subassembly consisting of one exciter unit 11, 11', 11" and one receiver unit 22, 22', 22".

Moreover, there is no angular phase shift about the axis of rotation 2 between each exciter unit 11, 11', 11", with each exciter unit 11, 11', 11" being fed by a single phase alternating electric current in the motor operating mode. However, the three exciter units 11, 11', 11" may for example be powered by three phases of a balanced three-phase alternating electric current if an angular offset is provided between each exciter unit 11, 11', 11" about the axis of rotation 2.

Likewise, in the generator operating mode the rotation of the rotor 20 causes the appearance of the same single phase alternating electric current in each exciter unit 11, 11', 11". Conversely, if there is an angular offset between each exciter unit 11, 11', 11" about the axis of rotation 2, a balanced three-phase alternating electric current appears in each exciter unit 11, 11', 11".

Figure 8:
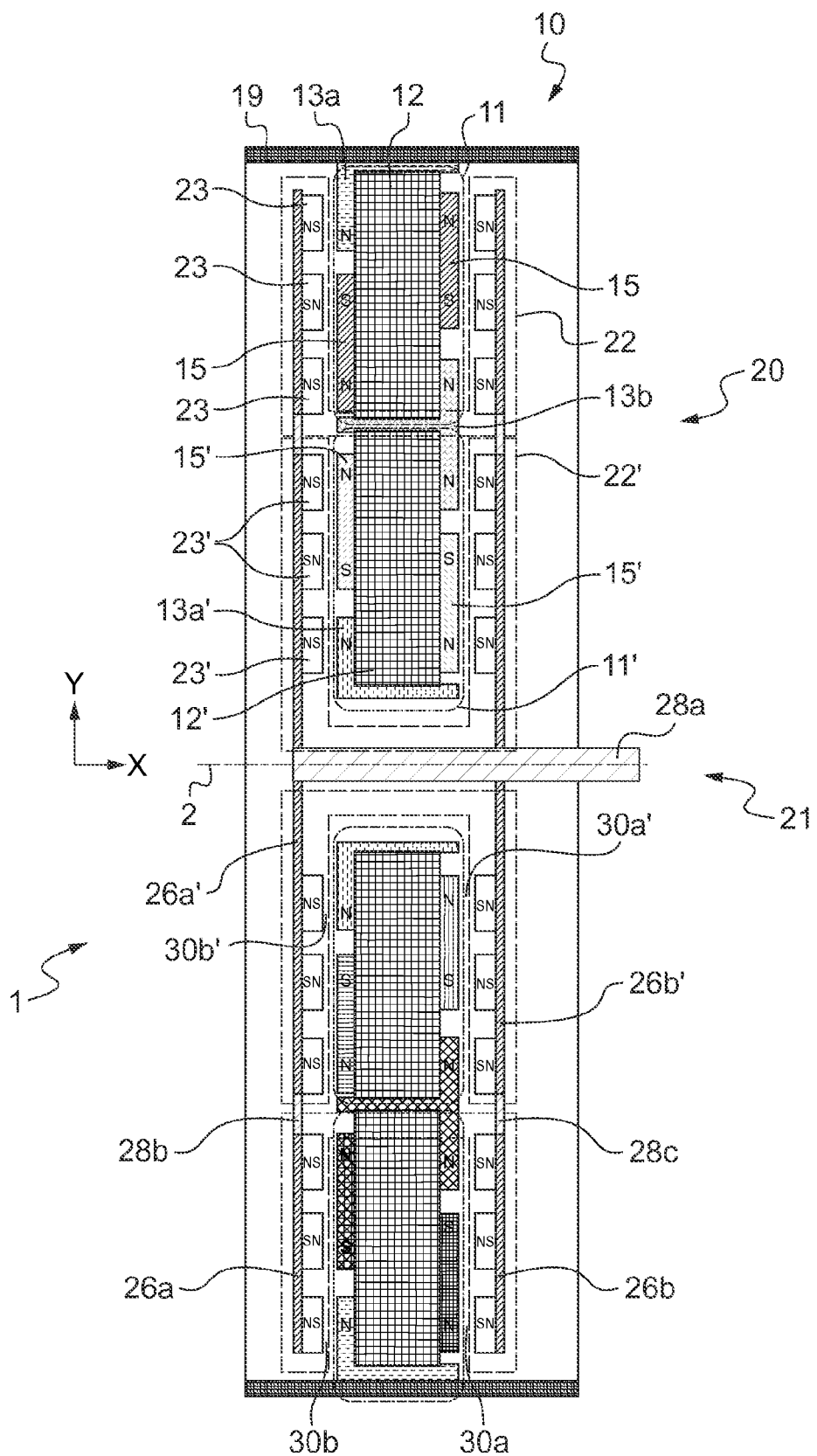

FIG. 8 shows an electric machine 1 with a 3D axial magnetic flux consisting of two exciter units 11, 11' and two receiver units 22, 22' that are associated in a radial manner, and two exciter units 11, 11' that form a line perpendicular to the axis of rotation 2, where the rotor 20 is inside the stator 10.

In order to limit the dimensions of such an electric machine 1, as well as its number of components, the exciter units 11, 11' are separated only by a single yoke 13b, which is used in common by these two exciter units 11, 11'.

According to a first coverage pattern, the yokes 13 and the intermediate pieces 15 are thus the extremity of each second tooth 16 that do not extend beyond the face 121 of the coils 12, 12'. In fact, the second coverage pattern of the teeth 14 on the faces 121 of the coil 12 makes such an architecture for the electric machine 1 impossible without a significant presence of significant and unacceptable magnetic leakage between the pairs consisting of an exciter unit 11, 11' and a receiver unit 22, 22'.

The two exciter units 11, 11' also function independently of each other, with an axial 3D magnetic flux circulating simultaneously in each subassembly consisting of one exciter unit 11, 11' and one receiver unit 22, 22'.

However, to ensure this independence, it is preferable for each receiver unit 22, 22" to be magnetically isolated. In fact, in contrast to the electric machine 1 shown in FIG. 7, the exciter units 11, 11' are separated by the yoke 13b', which is made of a ferromagnetic material. In fact, in order to primarily prevent magnetic losses between the exciter units 11, 11' and the receiver units 22, 22', the structure 21 of the rotor 20 includes the second parts 28b, 28c made from a non-magnetic material that isolates the first parts 26a, 26'a, 26b, 26'b between each series of magnet 23. In fact, the two receiver units 22, 22' are magnetically isolated.

In the electric machine 1 shown in FIG. 8, there is no angular phase shift between each of the exciter units 11, 11', which are fed by a single phase alternating electric current in the motor operating mode. In contrast, the two exciter units 11, 11' are fed by two inverse single phase currents. In fact, a magnetic flux from each exciter unit 11 and 11' passes through the same yoke 13b. Furthermore, a magnetic flux revolves naturally about the current, in a direction that is predetermined by the direction of this current. Indeed, when the two currents circulating in two adjacent exciter units 11, 11' are inverted, the two magnetic fluxes passing through the same yoke 13b separate from each other in this yoke 13a, ensuring that they will be directed toward the corresponding receiver unit 22, 22', with the two magnetic fluxes thus remaining independent.

Figure 9:
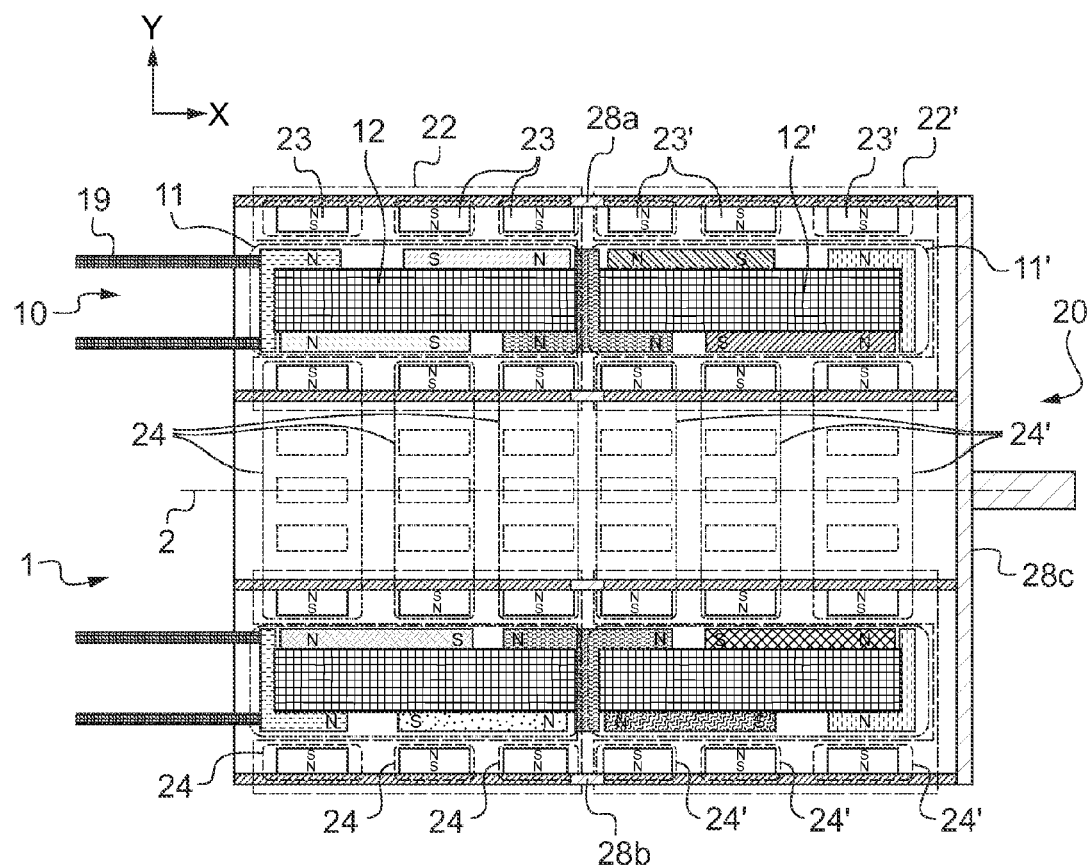

FIG. 9 shows an electric machine 1 with a radial 3D magnetic flux including two exciter units 11, 11' and two receiver units 22, 22'. This association is implemented axially, with the two exciter units 11, 11' forming a line parallel to the axis of rotation 2.

In the same way as for the variant shown in FIG. 8, two adjacent exciter units 11, 11' are separated by a yoke that is used jointly by these two exciter units 11, 11', so as to reduce the space requirement of such an electric machine 1. A radial 3D magnetic flux thus circulates in each subassembly formed by one exciter unit 11, 11' and one receiver unit 12, 12', where the exciter units 11, 11' are fed by two inverted single phase alternating electric currents.

Figure 10:
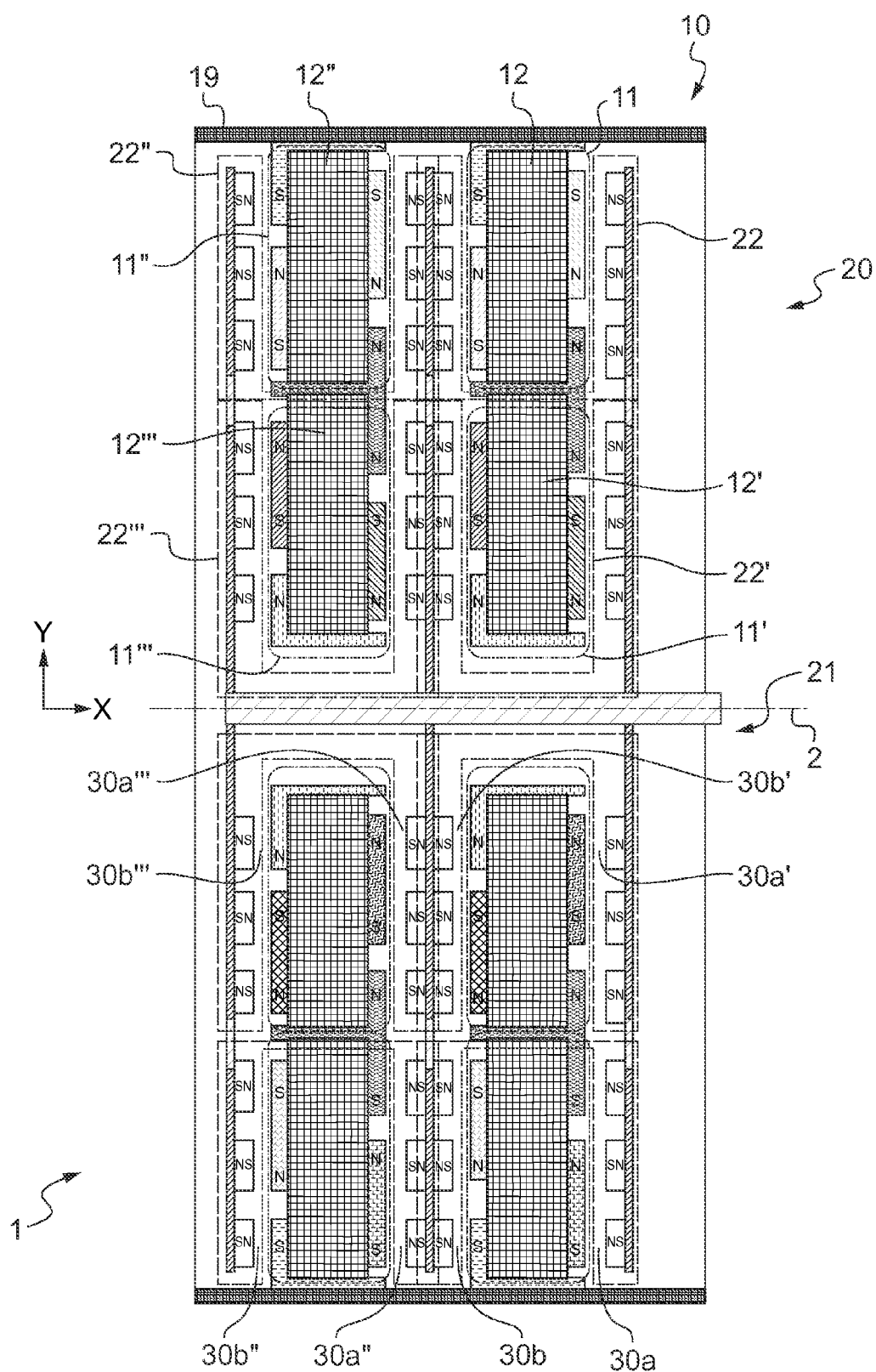

FIG. 10 shows a simultaneously radial and axial association of four exciter units and four receiver units. In fact, this electric machine 1 includes two subassemblies consisting of the variant shown in FIG. 8, namely, two exciter units and two receiver units that are radially associated, with these two subassemblies themselves being axially combined.

Figure 11A:
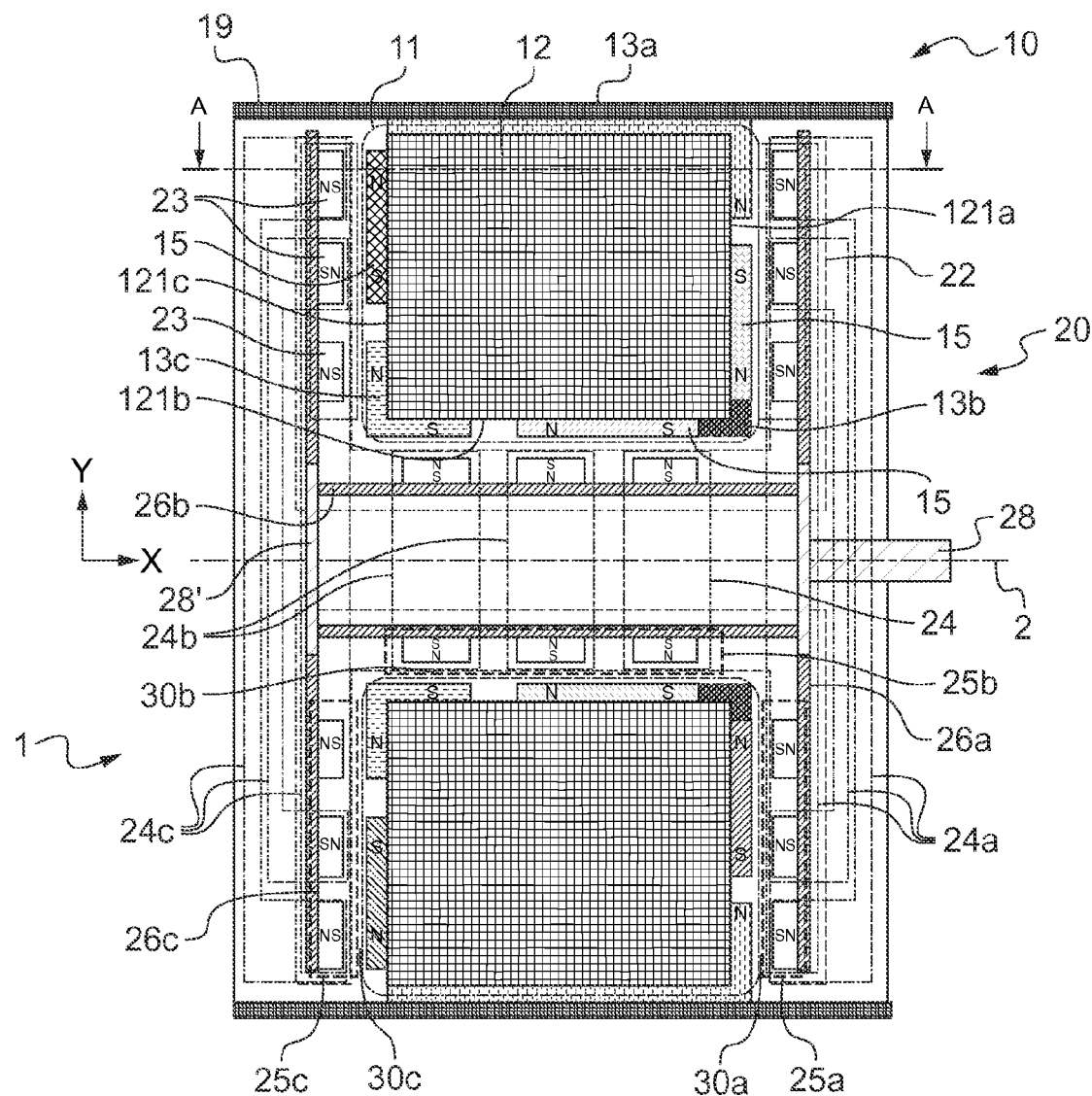

FIG. 11 shows a first embodiment of an electric machine 1 that relates to the invention. According to FIG. 11A, such an electric machine 1 includes an axis of rotation 2, a stator 10 and a rotor 20 that revolves about the axis of rotation 2 and inside the stator 10.

The rotor 20 includes a structure 21 and an annular receiver unit 22 equipped with three series 25a, 25b, 25c of magnets 23, with each series 25a, 25b, 25c having three rows 14 of magnets 23, where each magnet 23 has a first north pole and a first south pole. Each row 24 is thereby made up of alternating first north poles and first south poles, with the magnets 23 of these rows 24 being positioned so that two adjacent magnets 23 have opposite polarities.

This structure 21 of this rotor 20 includes three first parts 26a, 26b, 26c, made of a ferromagnetic material, upon which are positioned, respectively, three series 25a, 25b, 25c of magnets 23, and a second part 28, 28' that allows these three first parts 26a, 26b, 26c to be attached, while ensuring magnetic isolation between them, with this second part 25a, 25b being made of a non-magnetic material.

Figure 12:
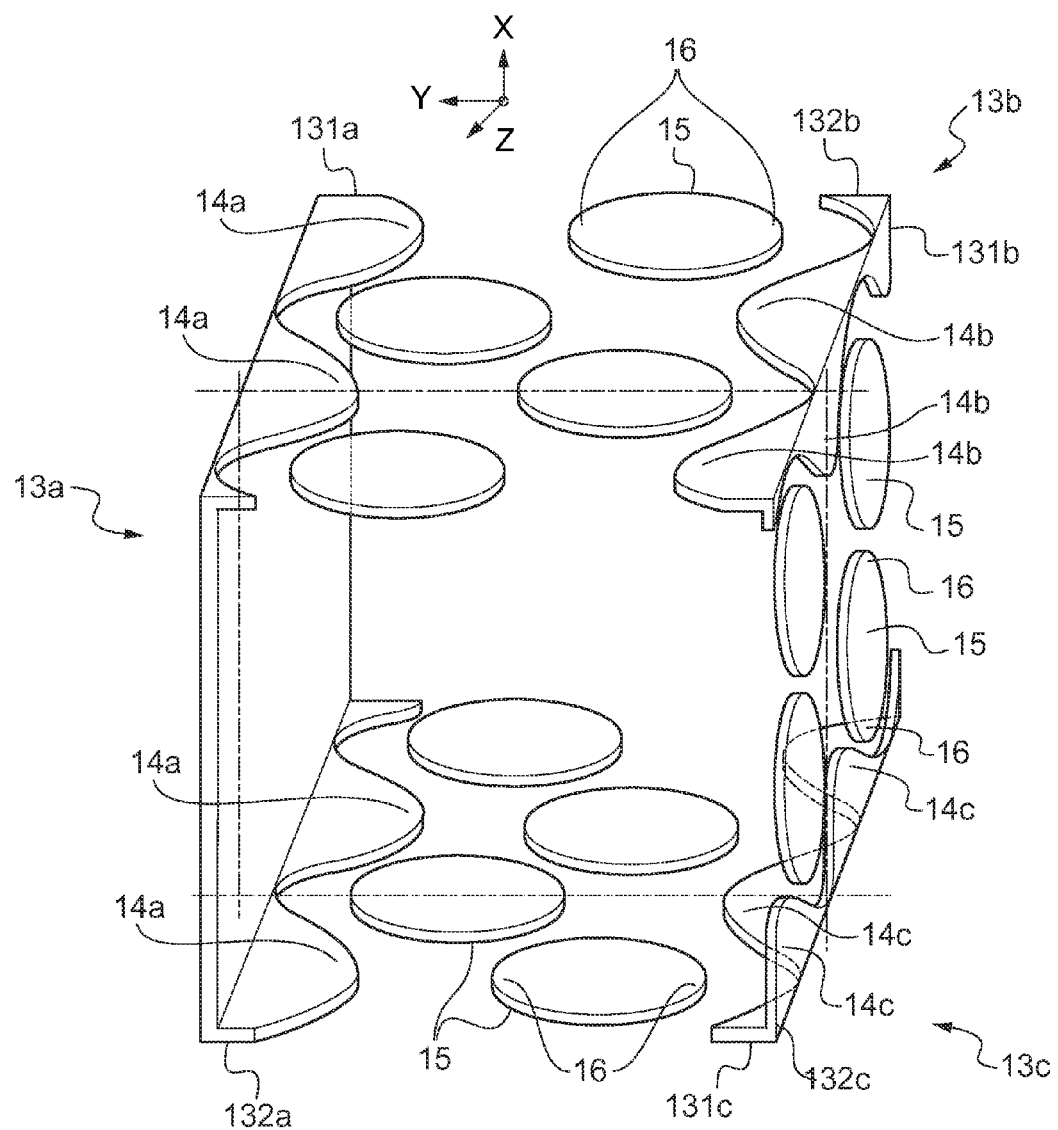
FIG. 12 shows the yokes and the placement of the intermediate pieces in this second embodiment.

The stator 10 includes an armature 19 and an annular exciter unit 11 that is equipped with a coil 12, three annular yokes 13a, 13b, 13c and intermediate pieces 15. One portion of these yokes 13 is shown in FIG. 12, as well as the placement of the intermediate pieces 15. A yoke 13a includes three sides, two of which are extreme sides 131a, 132a and one of which is an intermediate side 133a, and two yokes 13b, 13c that include two extreme sides 131b, 132b and 131c, 132c, respectively. Each extreme side 131, 132 includes a plurality of first teeth 14 distributed angularly in a regular manner about the axis of rotation 2. Each intermediate piece 15 includes two extremities that form two second teeth 16. The coil 12 is located inside the three yokes 13a, 13b, 13c and the intermediate pieces 15 in order to form the exciter unit 11.

The first teeth 14 of the three yokes 13 are positioned on three faces 121a, 121b, 121c of the coil 12 and the intermediate pieces 15 are positioned on two annular rows on the three faces 121a, 121b, 121c as shown in FIG. 12. These intermediate pieces 15 are positioned, as in the first embodiment shown in FIGS. 1 and 2, on the three faces 121a, 121b, 121c between the first teeth 14 of two yokes 13.

The receiver unit 22 cooperates with the exciter unit 11 and each series 25a, 25b, 25c of magnets 23 is situated opposite the exciter unit 11 such that each magnet 23 has a first pole located in front of one of the faces 121a, 121b, 121c on which the intermediate pieces 15 are positioned and the other first pole is located in front of a first part 26a, 26b of the structure 21 of the rotor 20. Thus, the first magnetic poles cooperate with the second magnetic poles, and three air gaps 30a, 30b, 30c are then formed between the receiver unit 22 and the exciter unit 11, more specifically, between each series 25a, 25b, 25c of magnets 23 and each face 121a, 121b, 121c.

Moreover, the total number of magnets 23 is equal to the total number of first teeth 14 and second teeth 16.

Indeed, during operation in motor mode, when an alternating electric current passes through the coil 12, each first tooth 14 and each second tooth 16 are magnetized, alternately forming second north poles and second south poles on each face 121a, 121b, 121c.

Consequently, a magnetic flux F circulates in the electric machine 1 as shown in FIG. 11B. This magnetic flux F thereby circulates from a first north pole of the rotor 20 toward a second south pole of the stator 10, then from a second north pole of the stator 10 toward a first south pole of the rotor 20, in a manner analogous to the first embodiment, a plurality of round trips between the exciter unit 11 and the receiver unit 22, but this time on three faces 121a, 121b, 121c of the coil 12.

Furthermore, in the same way as in the first embodiment of the invention, this magnetic flux F is divided and recombined in the vicinity of each yoke 13 of the stator 10 and in the vicinity of each magnet 23 of the rotor 20.

In the electric machine 1 shown in FIG. 11A, two air gaps 30a, 30c are oriented perpendicular to the axis of rotation 2, and one air gap 30b is oriented parallel to this axis of rotation 2. Indeed, the magnetic flux F circulates both axially and radially. The electric machine 1 shown in FIG. 11A is thus a multi-air-gap electric machine with a 3D magnetic flux.

Figure 14:
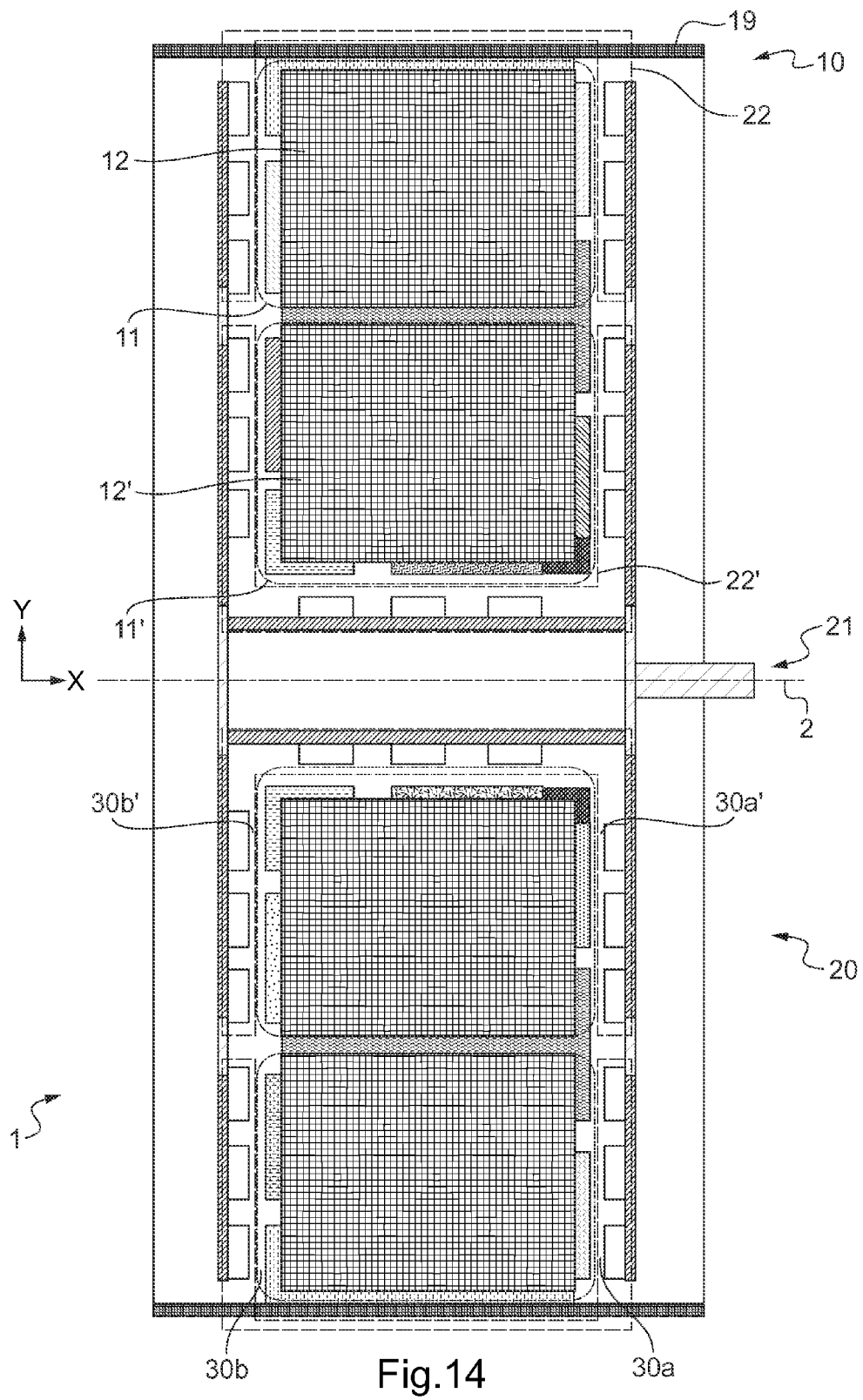

FIGS. 13 and 14 show two variants of the second embodiment of the invention including two exciter units 11, 11' and two receiver units 22, 22', thereby permitting an increase in performance of the electric machine 1, notably its torque.

FIG. 13 shows an electric machine 1 with a multi-gap 3D magnetic flux whose two exciter units 11, 11' and two receiver units 22, 22' have been associated in an axial manner, with the two exciter units 11, 11' forming a line parallel to the axis of rotation 2.

Moreover, there is no angular phase shift between each exciter unit 11, 11' about the axis of rotation 2, the exciter units 11, 11' are fed by a single phase alternating electric current in the motor operating mode, and a 3D magnetic flux circulates simultaneously in each subassembly consisting of an exciter unit 11, 11' and a receiver unit 22, 22'.

FIG. 14 shows an electric machine 1 with a multi-gap 3D magnetic flux consisting of two exciter units 11, 11' and two receiver units 22, 22' associated in a radial manner, with the rotor 20 rotating inside the stator 10.

As has been done previously, and in order to limit the dimensions of such an electric machine 1, a yoke assures the separation between two exciter units, and is used jointly by the two exciter units and two single phase inverse alternating electric currents feed the two exciter units 11,11'.

Moreover, the electric machine 1 shown in FIG. 14 includes an exciter unit 11 according to the first embodiment, i.e., equipped with two yokes and one exciter unit 11' according to a second embodiment, i.e., equipped with three yokes.

Figure 15A:
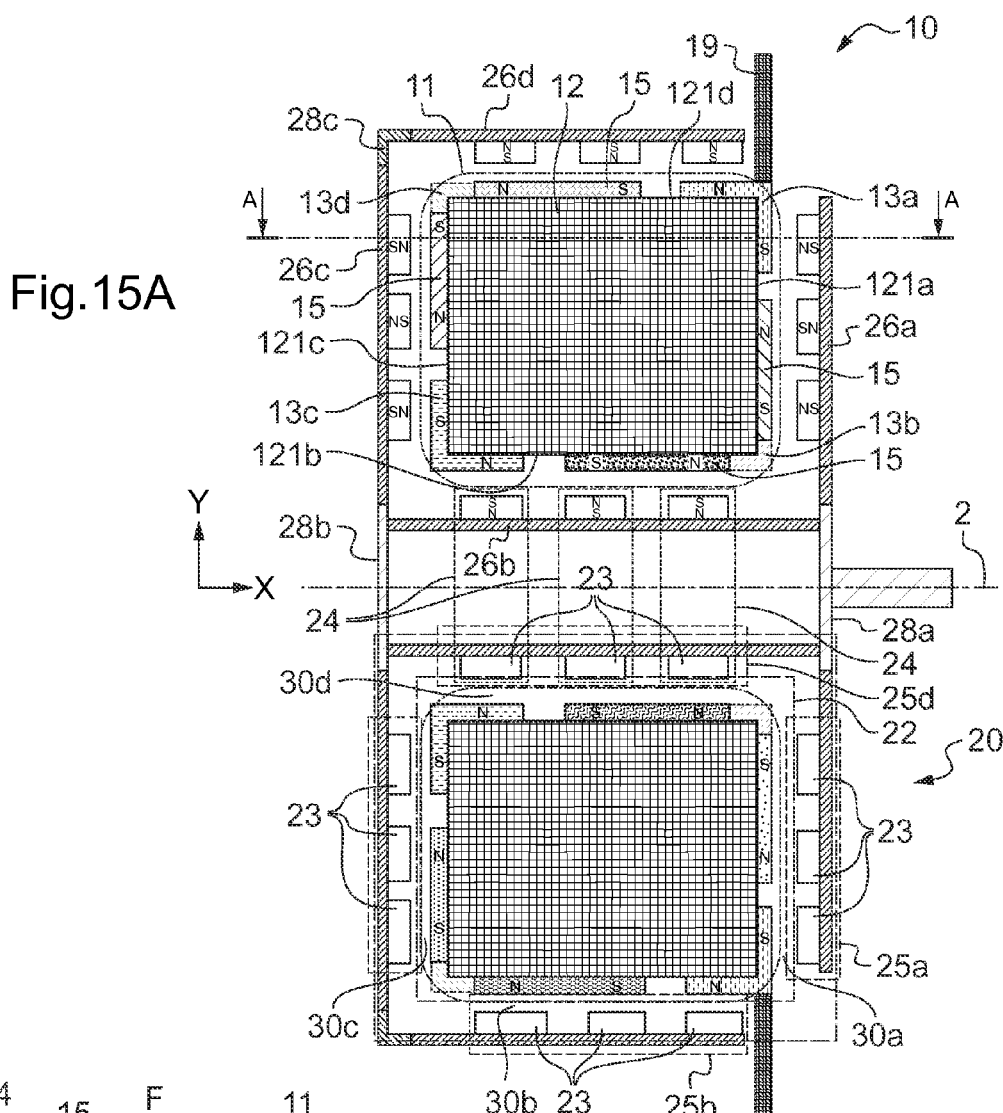
FIGS. 15A and 15B show various views of a third embodiment of the electric machine according to the invention.

FIG. 15 shows a third embodiment of an electric machine 1 that relates to the invention. According to FIG. 15A, such an electric machine 1 includes an axis of rotation 2, a stator 10 and a rotor 20 that revolves about the axis of rotation 2 and inside the stator 10.

The rotor 20 includes a structure 21 and an annular receiver unit 22 equipped with four series 25a, 25b, 25c, 25d of magnets 23, with each series 25a, 25b, 25c, 25d having three rows 24 of magnets 23, where each magnet 23 has a first north pole and a first south pole. Each row 24 is thereby made up of alternating first north poles and first south poles, with the magnets 23 of these rows 24 being positioned so that two adjacent magnets 23 have opposite polarities.

This structure 21 of this rotor 20 includes four first parts 26a, 26b, 26c, 26d on which are positioned, respectively, the four rows 24 of magnets 23, and three second parts 28a, 28b, 28c that allow these four first parts 26a, 26b, 26c, 26d to be attached while ensuring magnetic isolation between them with these second parts 28a, 28b, 28c being made of a non-magnetic material.

Figure 16:
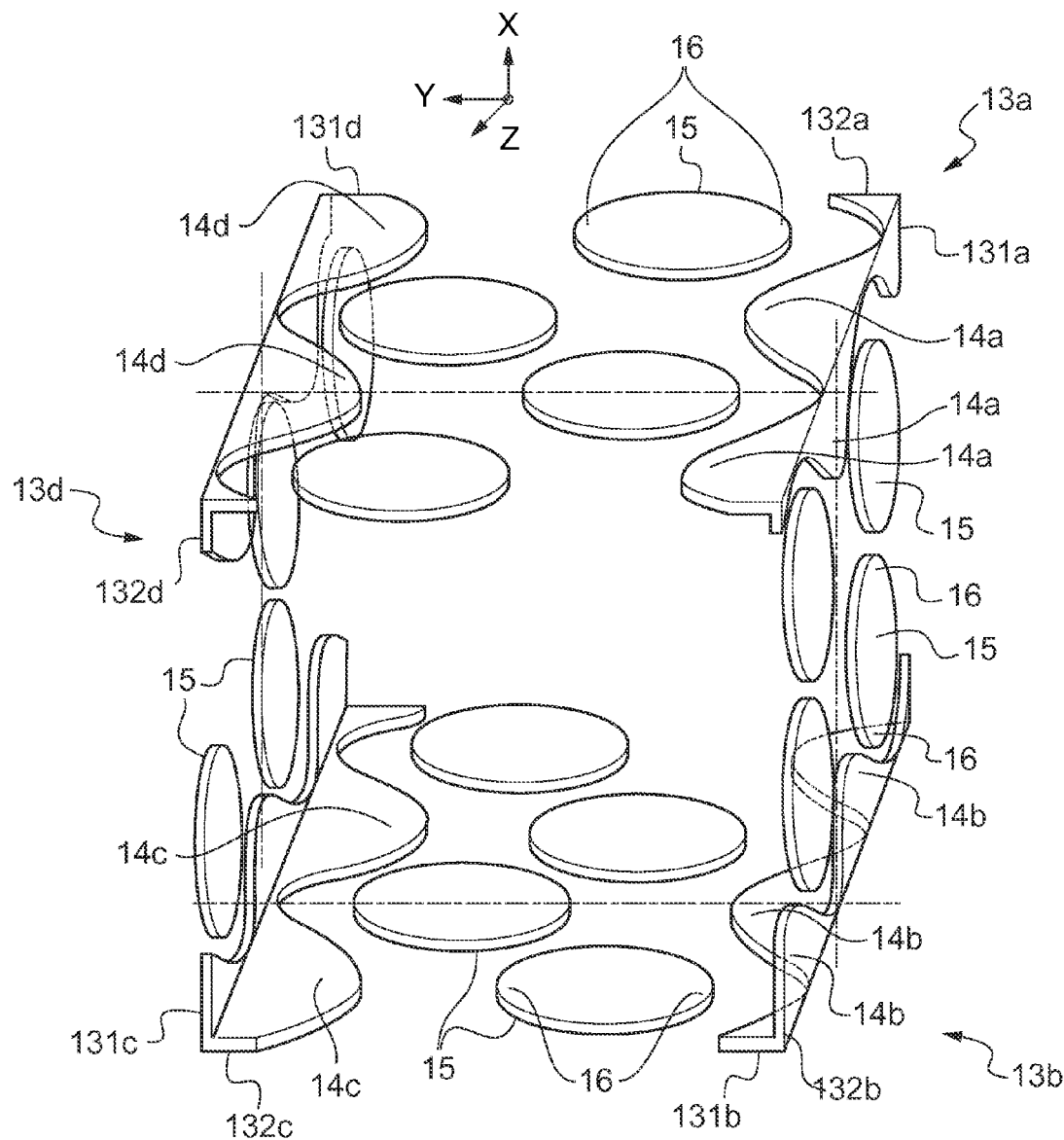
FIG. 16 shows the yokes and the placement of the intermediate pieces in this third embodiment.

The stator 10 includes an armature 19 and an annular exciter unit 11 that is equipped with a coil 12, four annular yokes 13a, 13b, 13c, 13d and a plurality of intermediate pieces 15. One portion of these yokes 13 is shown in FIG. 16, as well as the placement of the intermediate pieces 15. Each yoke 13a, 13b, 13c, 13d includes two extreme sides 131, 132 that include a plurality of first teeth 14 that are angularly distributed in a regular manner about the axis of rotation 2. Each intermediate piece 15 includes two extremities that form two second teeth 16. The coil 12 is located inside the four yokes 13a, 13b, 13c, 13d and the intermediate pieces 15 in order to form the exciter unit 11.

The first teeth 14 of the four yokes 13 are positioned on four faces 121a, 121b, 121c, 121d of the coil 12 and the intermediate pieces 15 are positioned on two annular rows on the four faces 121a, 121b, 121c, 121d as shown in FIG. 16. These intermediate pieces 15 are positioned, as for the previously shown embodiments, on the four faces 121a, 121b, 121c, 121d between the four teeth 14 of two yokes 13.

The receiver unit 22 cooperates with the exciter unit 11 with each series 24a, 24b, 24c, 24d of magnets 23 being situated opposite the exciter unit 11 in such a manner that each magnet 23 has a first pole situated in front of one of the faces 121a, 121b, 121c, 121d on which the intermediate pieces 15 and the other first pole are positioned facing a first part 26a, 26b of the structure 21 of the rotor 20. Thus, the first magnetic poles cooperate with the second magnetic poles, and four air gaps 30a, 30b, 30c, 30d are then formed between the receiver unit 22 and the exciter unit 11, more specifically, between each series 25a, 25b, 25c, 25d of magnets 23 and each face 121a, 121b, 121c, 121d.

Moreover, the total number of magnets 23 is equal to the total number of first teeth 14 and second teeth 16.

Indeed, during operation in motor mode, when an alternating electric current passes through the coil 12, each first tooth 14 and each second tooth 16 are magnetized, alternately forming second north poles and second south poles on each face 121a, 121b, 121c, 121d.

Figure 15B:
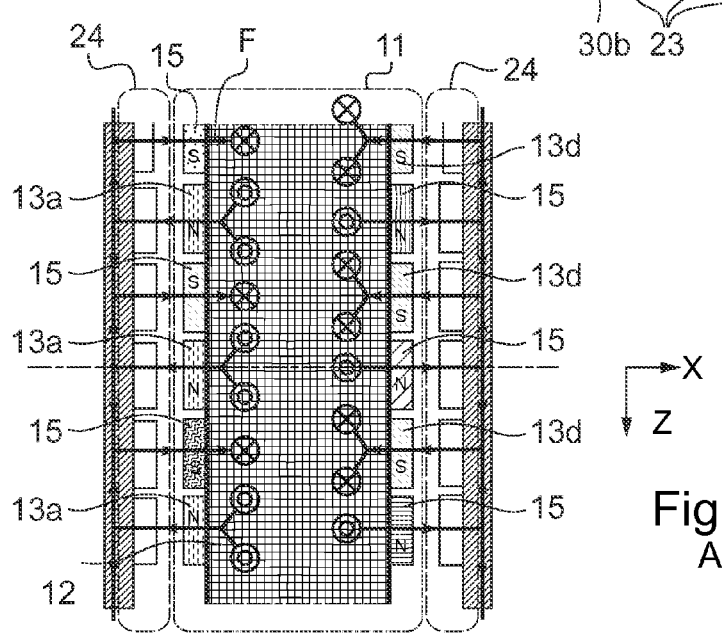

Consequently, a magnetic flux F circulates in the electric machine 1 as shown in FIG. 15B. This magnetic flux F thereby circulates from a first north pole of the rotor 20 toward a second south pole of the stator 10, then from a second north pole of the stator 10 toward a first south pole of the rotor 20, in a manner analogous to the preceding embodiments of the invention, a plurality of round trips between the exciter unit 11 and the receiver unit 22, but each time on four faces 121a, 121b, 121c, 121d of the coil 12.

Furthermore, in the same way as in the foregoing embodiments of the invention, this magnetic flux F is divided and recombined in the vicinity of each yoke 13 of the stator 10 and in the vicinity of each magnet 24 of the rotor 20.

In the electric machine 1 shown in FIG. 15A, two air gaps 30a, 30c are oriented perpendicular to the axis of rotation 2, and two air gaps 30b, 30d are oriented parallel to this axis of rotation 2. Indeed, the magnetic flux F circulates both axially and radially. The electric machine 1 shown in FIG. 15A is thus a multi-air-gap electric machine with a 3D magnetic flux.

Naturally, the present invention is subject to numerous variants in terms of its implementation. Although several embodiments have been described, it will be readily understood that not all of the possible modes can be identified exhaustively. Any of the means described herein may of course be replaced by equivalent means without departing from the scope of the present invention.

For example, the collection of figures describe the electric machines 1 that use only two rows of intermediate pieces 16 and three rows 24 of magnets 23. However, the row number of intermediate pieces 15 can be different, as long as this number is greater than or equal to one unit and that the number of rows 24 of magnets 23 is equal to this row number of intermediate pieces 16 plus one unit.

What is claimed is:

1. An electric machine with multiple air gaps and a 3D magnetic flux, including:

an axis of rotation;

a stator provided with an armature and at least one annular exciter unit including a coil, a first annular yoke, a second annular yoke, and a plurality of intermediate pieces, the coil being positioned inside the first and second yokes and having at least two faces, each respective yoke of the first yoke and the second yoke including a respective plurality of yoke teeth, and each respective intermediate piece of the plurality of intermediate pieces including a respective first extremity forming a respective first intermediate piece tooth and a respective second extremity forming a respective second intermediate piece tooth;

a rotor revolving around the axis of rotation and equipped with a structure and at least one annular receiver unit, with each receiver unit including a plurality of magnets and cooperating with a single respective exciter unit of the at least one exciter unit, with each magnet having a magnet north pole and a magnet south pole, with one of the magnet north pole and the magnet south pole being located opposite the respective exciter unit and with the other of the magnet north pole and the magnet south pole being located opposite the structure of the rotor, with the total number of magnets being equal to the total number of yoke teeth and intermediate piece teeth; and wherein each respective yoke includes at least two respective sides, with two of the respective sides being respective extreme sides, the respective plurality of yoke teeth of each respective yoke being angularly distributed in a regular manner on the respective two extreme sides about the axis of rotation, the plurality of intermediate pieces being positioned on at least one annular row over the at least two faces between the respective pluralities of yoke teeth of the first yoke and the second yoke, the respective first extremity of each respective intermediate piece of an initial respective row of the at least one row being disposed between respective first and second yoke teeth of the respective plurality of yoke teeth of the first yoke while maintaining a distance between the respective first intermediate piece tooth of the respective first extremity and the respective first and second yoke teeth, the respective second extremity of each respective intermediate piece of a respective first row of the at least one row being disposed between respective first extremities of two respective intermediate pieces of a respective second row of the at least one row while maintaining the distance between the respective second intermediate piece tooth of the respective first row and the respective first intermediate piece teeth of the respective second row, and the respective second extremity of each respective intermediate piece of a last respective row being disposed between respective yoke teeth of the respective plurality of yoke teeth of the second yoke of by maintaining a distance between the respective second intermediate piece tooth of the last respective row and the respective first and second teeth of the second yoke, each respective yoke tooth and each respective intermediate piece tooth alternately forming tooth north poles and tooth south poles, with each intermediate piece including a respective tooth north pole and a respective tooth south pole, each respective receiver unit of the at least one receiver unit including at least two series of respective magnets of the plurality of magnets, with each series being made up of at least two rows of respective magnets two adjacent magnet poles have opposite polarity, where the magnets are angularly distributed in a regular manner about the axis of rotation over each row of magnets, with each series being situated opposite one of the at least two faces, with an air gap thereby being formed between each series of magnets and the respective exciter unit, a magnetic flux then circulating in three dimensions in the electric machine and being able to divide and regroup in a vicinity of the magnets of the rotor and being able to divide and regroup in the vicinity of the yokes of the stator.

2. The electric machine with multiple air gaps and a 3D magnetic flux according to claim 1, wherein the magnets are permanent magnets.

3. The electric machine with multiple air gaps and a 3D magnetic flux according to claim 1, wherein the magnets are non-permanent magnets.

4. The electric machine with multiple air gaps and a 3D magnetic flux according to claim 1, wherein a respective extreme side of the first yoke and the second yoke is positioned perpendicular to the axis of rotation, so that the magnetic flux circulates at least axially inside the electric machine.

5. The electric machine with multiple air gaps and a 3D magnetic flux according to claim 1, wherein a respective extreme side of the first yoke and the second yoke is positioned parallel to the axis of rotation, so that the magnetic flux circulates at least radially inside the electric machine.

6. The electric machine with multiple air gaps and a 3D magnetic flux according to claim 1, wherein each respective yoke tooth and each respective intermediate piece tooth is in a cat's-tongue shape.

7. The electric machine with multiple air gaps and a 3D magnetic flux according to claim 1, wherein each respective yoke tooth and each respective intermediate piece tooth is in a stairway shape.

8. The electric machine with multiple air gaps and a 3D magnetic flux according to claim 1, wherein each respective yoke includes a connection in the form of a chamfer at the base of each respective yoke tooth.

9. The electric machine with multiple air gaps and a 3D magnetic flux according to claim 1, wherein a respective exciter unit of the at least one exciter unit includes a third yoke and cooperates with a respective receiver unit of the at least one receiver unit that includes three respective series of magnets, with three air gaps thus being formed between the respective exciter unit and the respective receiver unit.

10. The electric machine with multiple air gaps and a 3D magnetic flux according to claim 1, wherein a respective exciter unit of the at least one exciter unit includes a third yoke and a fourth yoke and cooperates with a respective receiver unit of the at least one receiver unit that includes four respective series of magnets, with four air gaps thus being formed between the respective exciter unit and the respective receiver unit.

11. The electric machine with multiple air gaps and a 3D magnetic flux according to claim 1, wherein the stator includes at least two respective exciter units distributed radially with respect to the axis of rotation and the rotor includes at least two respective receiver units distributed radially with respect to the axis of rotation.

12. The electric machine with multiple air gaps and a 3D magnetic flux according to claim 1, wherein each respective exciter unit is fed by a monophase electric current.

13. The electric machine with multiple air gaps and a 3D magnetic flux according to claim 1, wherein the respective yoke teeth of the two extreme sides of at least one respective yoke are angularly distributed in a regular manner about the axis of rotation and alternately on the two extreme sides.

14. The electric machine with multiple air gaps and a 3D magnetic flux according to claim 1, wherein the respective yoke teeth of the two extreme sides of at least one respective yoke are oriented face to face.

15. The electric machine with multiple air gaps and a 3D magnetic flux according to claim 1, wherein the respective first extremity and the respective second extremity of each respective intermediate piece of the initial respective row and of the last respective row do not extend beyond the at least two faces of the coil.

16. The electric machine with multiple air gaps and a 3D magnetic flux according to claim 1, wherein the respective first extremity and the respective second extremity of each respective intermediate piece of the initial respective row and of the last respective row extends beyond the at least two faces of the coil.

17. An electric machine with multiple air gaps and a 3D magnetic flux, including:
an axis of rotation;
a stator provided with an armature and at least one annular exciter unit including a coil, a first annular yoke, a second annular yoke, and a plurality of intermediate pieces, the coil being positioned inside the first and second yokes and having at least two faces, each respective yoke of the first yoke and the second yoke including a respective plurality of yoke teeth, and each respective intermediate piece of the plurality of intermediate pieces including a respective first extremity forming a respective first intermediate piece tooth and a respective second extremity forming a respective second intermediate piece tooth;
a rotor revolving around the axis of rotation and equipped with a structure and at least one annular receiver unit, with each receiver unit including a plurality of magnets and cooperating with a single respective exciter unit of the at least one exciter unit, with each magnet having a magnet north pole and a magnet south pole, with one of the magnet north pole and the magnet south pole being located opposite the respective exciter unit and with the other of the magnet north pole and the magnet south pole being located opposite the structure of the rotor, with the total number of magnets being equal to the total number of yoke teeth and intermediate piece teeth; and
wherein each respective yoke includes at least two respective sides, with two of the respective sides being respective extreme sides, the respective plurality of yoke teeth of each respective yoke being angularly distributed in a regular manner on the respective two extreme sides about the axis of rotation, the plurality of intermediate pieces being positioned on at least one annular row over the at least two faces between the respective pluralities of yoke teeth of the first yoke and the second yoke, the respective first extremity of each respective intermediate piece of an initial respective row of the at least one row being disposed between respective first and second yoke teeth of the respective plurality of yoke teeth of the first yoke while maintaining a distance between the respective first intermediate piece tooth of the respective first extremity and the respective first and second yoke teeth, the respective second extremity of each respective intermediate piece of a respective first row of the at least one row being disposed between respective first extremities of two respective intermediate pieces of a respective second row of the at least one row while maintaining the distance between the respective second intermediate piece tooth of the respective first row and the respective first intermediate piece teeth of the respective second row, and the respective second extremity of each respective intermediate piece of a last respective row being disposed between respective yoke teeth of the respective plurality of yoke teeth of the second yoke of by maintaining a distance between the respective second intermediate piece tooth of the last respective row and the respective first and second teeth of the second yoke, each respective yoke tooth and each respective intermediate piece tooth alternately forming tooth north poles and tooth south poles, with each intermediate piece including a respective tooth north pole and a respective tooth south pole, each respective receiver unit of the at least one receiver unit including at least two series of respective magnets of the plurality of magnets, with each series being made up of at least two rows of respective magnets two adjacent magnet poles have opposite polarity, where the magnets are angularly distributed in a regular manner about the axis of rotation over each row of magnets, with each series being situated opposite one of the at least two faces, with an air gap thereby being formed between each series of magnets and the respective exciter unit, a magnetic flux then circulating in three dimensions in the electric machine and being able to divide and regroup in a vicinity of the magnets of the rotor and being able to divide and regroup in the vicinity of the yokes of the stator, wherein a respective exciter unit of the at least one exciter unit cooperates with a respective receiver unit of the at least one receiver unit that includes two respective series of magnets, with two air gaps thus being formed between the exciter unit and the receiver unit.

18. An electric machine with multiple air gaps and a 3D magnetic flux, including:
an axis of rotation;
a stator provided with an armature and at least one annular exciter unit including a coil, a first annular yoke, a second annular yoke, and a plurality of intermediate pieces, the coil being positioned inside the first and second yokes and having at least two faces, each respective yoke of the first yoke and the second yoke including a respective plurality of yoke teeth, and each respective intermediate piece of the plurality of intermediate pieces including a respective first extremity forming a respective first intermediate piece tooth and a respective second extremity forming a respective second intermediate piece tooth;
a rotor revolving around the axis of rotation and equipped with a structure and at least one annular receiver unit, with each receiver unit including a plurality of magnets and cooperating with a single respective exciter unit of the at least one exciter unit, with each magnet having a magnet north pole and a magnet south pole, with one of the magnet north pole and the magnet south pole being located opposite the respective exciter unit and with the other of the magnet north pole and the magnet south pole being located opposite the structure of the rotor, with the total number of magnets being equal to the total number of yoke teeth and intermediate piece teeth; and wherein each respective yoke includes at least two respective sides, with two of the respective sides being respective extreme sides, the respective plurality of yoke teeth of each respective yoke being angularly distributed in a regular manner on the respective two extreme sides about the axis of rotation, the plurality of intermediate pieces being positioned on at least one annular row over the at least two faces between the respective pluralities of yoke teeth of the first yoke and the second yoke, the respective first extremity of each respective intermediate piece of an initial respective row of the at least one row being disposed between respective first and second yoke teeth of the respective plurality of yoke teeth of the first yoke while maintaining a distance between the respective first intermediate piece tooth of the respective first extremity and the respective first and second yoke teeth, the respective second extremity of each respective intermediate piece of a respective first row of the at least one row being disposed between respective first extremities of two respective intermediate pieces of a respective second row of the at least one row while maintaining the distance between the respective second intermediate piece tooth of the respective first row and the respective first intermediate piece teeth of the respective second row, and the respective second extremity of each respective intermediate piece of a last respective row being disposed between respective yoke teeth of the respective plurality of yoke teeth of the second yoke of by maintaining a distance between the respective second intermediate piece tooth of the last respective row and the respective first and second teeth of the second yoke, each respective yoke tooth and each respective intermediate piece tooth alternately forming tooth north poles and tooth south poles, with each intermediate piece including a respective tooth north pole and a respective tooth south pole, each respective receiver unit of the at least one receiver unit including at least two series of respective magnets of the plurality of magnets, with each series being made up of at least two rows of respective magnets two adjacent magnet poles have opposite polarity, where the magnets are angularly distributed in a regular manner about the axis of rotation over each row of magnets, with each series being situated opposite one of the at least two faces, with an air gap thereby being formed between each series of magnets and the respective exciter unit, a magnetic flux then circulating in three dimensions in the electric machine and being able to divide and regroup in a vicinity of the magnets of the rotor and being able to divide and regroup in the vicinity of the yokes of the stator, wherein the stator includes at least two respective exciter units distributed axially with respect to the axis of rotation and the rotor includes at least two respective receiver units distributed axially with respect to the axis of rotation.

19. The electric machine with multiple air gaps and a 3D magnetic flux according to claim 18, wherein one respective yoke separates two adjacent exciter units and is used jointly by the two adjacent exciter units, with two magnetic fluxes relating respectively to the two adjacent exciter units, circulating in the respective yoke.

20. The electric machine with multiple air gaps and a 3D magnetic flux according to claim 18, wherein at least two respective exciter units are fed by two different phases of a balanced polyphase electric current.

* * * * *